United States Patent
Flick et al.

(10) Patent No.: US 12,207,580 B2
(45) Date of Patent: Jan. 28, 2025

(54) TRAILED IMPLEMENT WITH VISION GUIDANCE

(71) Applicant: MACDON INDUSTRIES LTD., Winnipeg (CA)

(72) Inventors: Daniel Flick, Sun Prairie, WI (US); Karl Hundt, Sun Prairie, WI (US); Nolan Monhollen, Sun Prairie, WI (US)

(73) Assignee: MacDon Industries LTD., Winnipeg (CA)

( * ) Notice: Subject to any disclaimer, the term of this patent is extended or adjusted under 35 U.S.C. 154(b) by 509 days.

(21) Appl. No.: 17/499,237

(22) Filed: Oct. 12, 2021

(65) Prior Publication Data

US 2023/0114803 A1   Apr. 13, 2023

(51) Int. Cl.
| | |
|---|---|
| *A01B 69/00* | (2006.01) |
| *G05D 1/00* | (2024.01) |
| *G06N 3/08* | (2023.01) |
| *G06T 7/10* | (2017.01) |
| *G06V 20/10* | (2022.01) |
| *G06V 20/56* | (2022.01) |

(52) U.S. Cl.
CPC .......... *A01B 69/001* (2013.01); *A01B 69/004* (2013.01); *G05D 1/0246* (2013.01); *G06N 3/08* (2013.01); *G06T 7/10* (2017.01); *G06V 20/188* (2022.01); *G06V 20/56* (2022.01); *G06T 2207/20081* (2013.01); *G06T 2207/20084* (2013.01); *G06T 2207/30188* (2013.01)

(58) Field of Classification Search
CPC ...... A01B 69/001; A01B 69/004; G06N 3/08; G06T 7/10; G06T 2207/20081; G06T 2207/20084; G06T 2207/30188; G06V 20/188

See application file for complete search history.

(56) References Cited

U.S. PATENT DOCUMENTS

| | | | |
|---|---|---|---|
| 6,385,515 B1 | 5/2002 | Dickson et al. | |
| 7,792,622 B2* | 9/2010 | Wei | A01B 69/001 345/589 |
| 7,904,226 B2 | 3/2011 | Dix | |
| 8,359,141 B1 | 1/2013 | Lange | |
| 8,640,785 B2* | 2/2014 | Diaz | A01B 63/22 172/278 |
| 8,924,099 B2 | 12/2014 | Nelson, Jr. | |
| 9,913,422 B2 | 3/2018 | Mitchel et al. | |
| 10,085,371 B2* | 10/2018 | Sudbrink | A01B 63/22 |
| 10,104,827 B2* | 10/2018 | Adamchuk | A01B 69/001 |
| 2013/0161034 A1* | 6/2013 | Borkgren | A01B 69/003 172/166 |

(Continued)

FOREIGN PATENT DOCUMENTS

| | | | |
|---|---|---|---|
| CN | 113128576 A | * | 7/2021 |
| GB | 2598141 A1 | | 2/2022 |

OTHER PUBLICATIONS

English Translation of CN-113128576 (Year: 2021).*

*Primary Examiner* — Anshul Sood

(74) *Attorney, Agent, or Firm* — Miller Canfield

(57) ABSTRACT

A method of navigating a vehicle through a field as it is being towed by a tractor. The method comprises obtaining an image of the field, segmenting the image to identify one or more crop rows, and steering the vehicle to avoid the one or more crop rows.

12 Claims, 18 Drawing Sheets

(56) References Cited

U.S. PATENT DOCUMENTS

| | | | |
|---|---|---|---|
| 2014/0262378 A1* | 9/2014 | Connors | A01B 69/003 172/387 |
| 2020/0236833 A1 | 7/2020 | Kremmer et al. | |
| 2020/0390022 A1* | 12/2020 | Stanhope | G01C 7/04 |
| 2021/0000006 A1* | 1/2021 | Ellaboudy | A01B 69/008 |
| 2023/0104695 A1* | 4/2023 | Pethe | G06T 7/0016 345/419 |

* cited by examiner

TRAILED IMPLEMENT WITH VISION GUIDANCE

TECHNICAL FIELD

The present invention relates to a method and system for using vision guidance to guide a trailed implement through a field.

BACKGROUND OF THE INVENTION

Many factors affect how accurately trailed agricultural equipment remains in alignment with crop rows as it is being pulled through a field. For example, soil conditions or the weight on the implement may cause the implement to drift off track. In addition, as the curvature in rows increases or longitudinal travel along steep grades is encountered, the ability of the implement to passively follow the rows is reduced. GPS-based and gyroscopic systems exist to compensate for hillside drift of the implement to follow the path of the tractor. GPS-based systems are unable to compensate for drift, however, if the rows are not originally planted using GPS correction equipment. Additionally, gyroscopic systems do not account for varying levels of drift due to soil conditions, variance in the machine's payload or if there is GPS error present.

In a further aspect, cultivator technology is generally known, wherein row crop cultivators are often used to cultivate soil between rows of crops such as for weeding of an agricultural field. For descriptive purposes herein, such row crop cultivators may also be referenced as cultivators. The row crop cultivator, or more simply cultivator, may include a lateral toolbar and a selected number of cutting devices that work the soil between rows in a manner that helps eliminate weeds. Known row crop cultivators of this type are pulled behind a tractor and rely upon the skill of the operator to steer the tractor and thereby guide the implement between rows without damaging crops.

In some cultivators, a camera may be provided to detect the crop rows and correct the position of the cultivator so that the cutting devices are centered on the rows. The camera can generate a live video that is analyzed to detect the crop rows. Some manufacturers may include side shift technology or features that translates the cultivator toolbar on a series of support shafts by an actuator wherein the actuator may be operated to translate the lateral position of the toolbar.

It is an object of the invention to provide improved implements and an improved vision guidance system for trailed implements that incorporates improvements over known agricultural implements.

SUMMARY OF THE INVENTION

In one aspect, the present invention uses a vision guidance system to correct the position of a trailed implement in growing rows of crop. Because the vision guidance system determines the actual position of the crop rows rather than relying on the expected position of the crop rows, the present invention corrects for the effects of field conditions on the implement.

According to one embodiment, there is provided a method of navigating a vehicle through a field as it is being towed by a tractor. The method comprises obtaining an image of the field, segmenting the image to identify a plurality of crop rows, and steering the vehicle to avoid the plurality of crop rows.

According to another embodiment, there is provided a system for navigating a vehicle through a field as it is being towed by a tractor. The system comprises an imaging device, an image processor and a steering control. The imaging device is mounted to the vehicle, and collects an image of the field. The image processor segments the image and identifies a plurality of crop rows. The steering control steers the vehicle to avoid the plurality of crop rows.

In a further embodiment of the invention, the vision guidance system is implemented in a precision row crop cultivator that permits farmers and the like to cultivate as close to the crop rows as possible without damage, while performing this operation at a relatively high speed. Generally, the row crop cultivator includes a toolbar having a plurality of row units provided thereon to work the soil between rows. For descriptive purposes herein, the row crop cultivator may more simply be referenced as a cultivator. In more detail, this cultivator is particularly suitable for cultivating between rows of standing crops, while avoiding damage thereto. This accuracy is accomplished through incorporation of the inventive vision guidance system into the cultivator, wherein the cultivator is configured to include a laterally shiftable toolbar. Rather than steering the implement, the vision guidance system operates to shift the lateral toolbar position relative to the tractor or other towing vehicle. This allows the control system to identify the path of each row and then the toolbar is shifted as required to maintain the row units on the toolbar in the desired position between adjacent rows. While the preferred configuration of this implement is a row crop cultivator, a laterally shiftable design can be adapted onto other types of implements wherein the vision guidance system provided to control the lateral position of the implement and components thereof relative to the row crops.

In another aspect of the invention, the toolbar is not only laterally shiftable, but also is configured to flex to help conform to ground contours. The toolbar preferably is configured with opposite end sections pivotally mounted on a central toolbar section, wherein the toolbar end sections are foldable for storage and transport. The central toolbar section may be supported, for example, by a 3-point tractor hitch on the tractor, and is configured to shift laterally as reference above.

Further, each row unit preferably comprises one or more cutting devices, such as ground-engaging sweeps or the like which may include both leading sweeps and trailing sweeps. The cutting devices for each row unit may be mounted on a support linkage that permits independent, vertical movement relative to the toolbar and the other row units. The row unit may also include wheels to follow the ground contours.

The support linkage preferably is formed as a four-bar linkage that allows the cutting device to float relative to the toolbar. The support linkage includes fixed pivots attached to and supported on the toolbar and floating pivots joined together by individual pivot links, wherein the cutting device is attached to the links at the floating ends of the pivot links so that the cutting device can float vertically relative to the toolbar and the fixed pivots supported thereon. In other words, the support linkage may be configured with a leading parallel linkage design that has the floating pivots located ahead of the fixed pivots so that the row units naturally engage the ground while also having a compact structure. This configuration also reduces the need for lift assist wheels and other moment-reducing devices.

To further ensure ground following by the row units, each row unit may include an actuator that can connect to the support linkage and can be operated to adjust the down force on the row unit. The actuators may also be operated to lift the row units when operating in areas that might be partially cultivated or otherwise require lifting of the row unit as to not damage crop. The actuators may be operated independent of or together with the other row units.

As disclosed and described herein, this vision guidance system can better detect crops for adjusting the implement position by steering the implement or adjusting a laterally shiftable toolbar relative to the tractor.

Other objects and purposes of the invention, and variations thereof, will be apparent upon reading the following specification and inspecting the accompanying drawings.

BRIEF DESCRIPTION OF THE DRAWINGS

Advantages of the present invention will be readily appreciated as the same becomes better understood by reference to the following detailed description when considered in connection with the accompanying drawings wherein:

FIG. 6 is a flow diagram illustrating the method performed by the vision guidance system as the trailed implement is pulled through the field;

Figure 1:
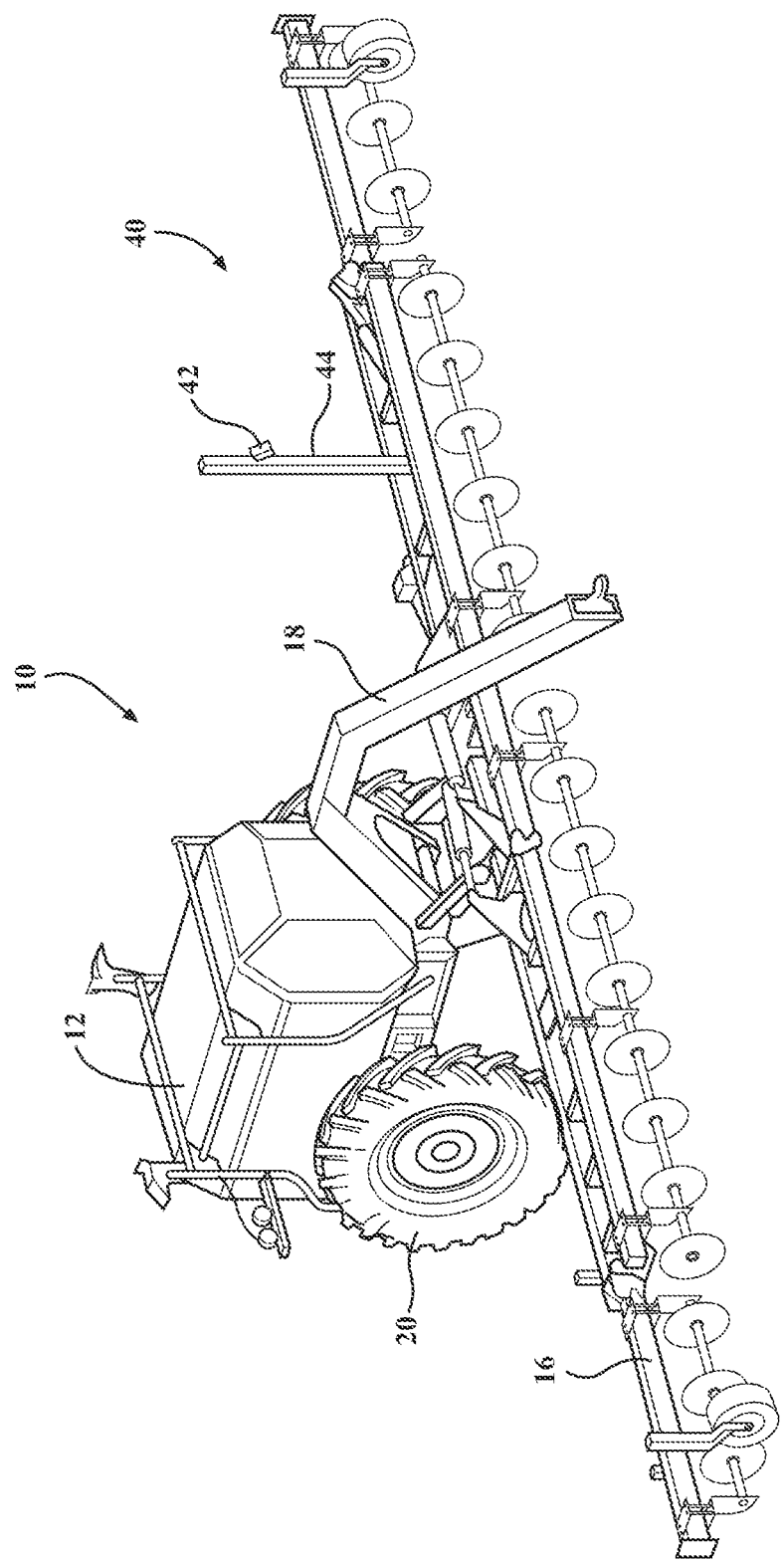
FIG. 1 is a perspective view of a steerable trailed implement in accordance with one embodiment of the present invention.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. The terminology will include the words specifically mentioned, derivatives thereof, and words of similar import.

DETAILED DESCRIPTION OF EXAMPLE EMBODIMENTS

Figure 2:
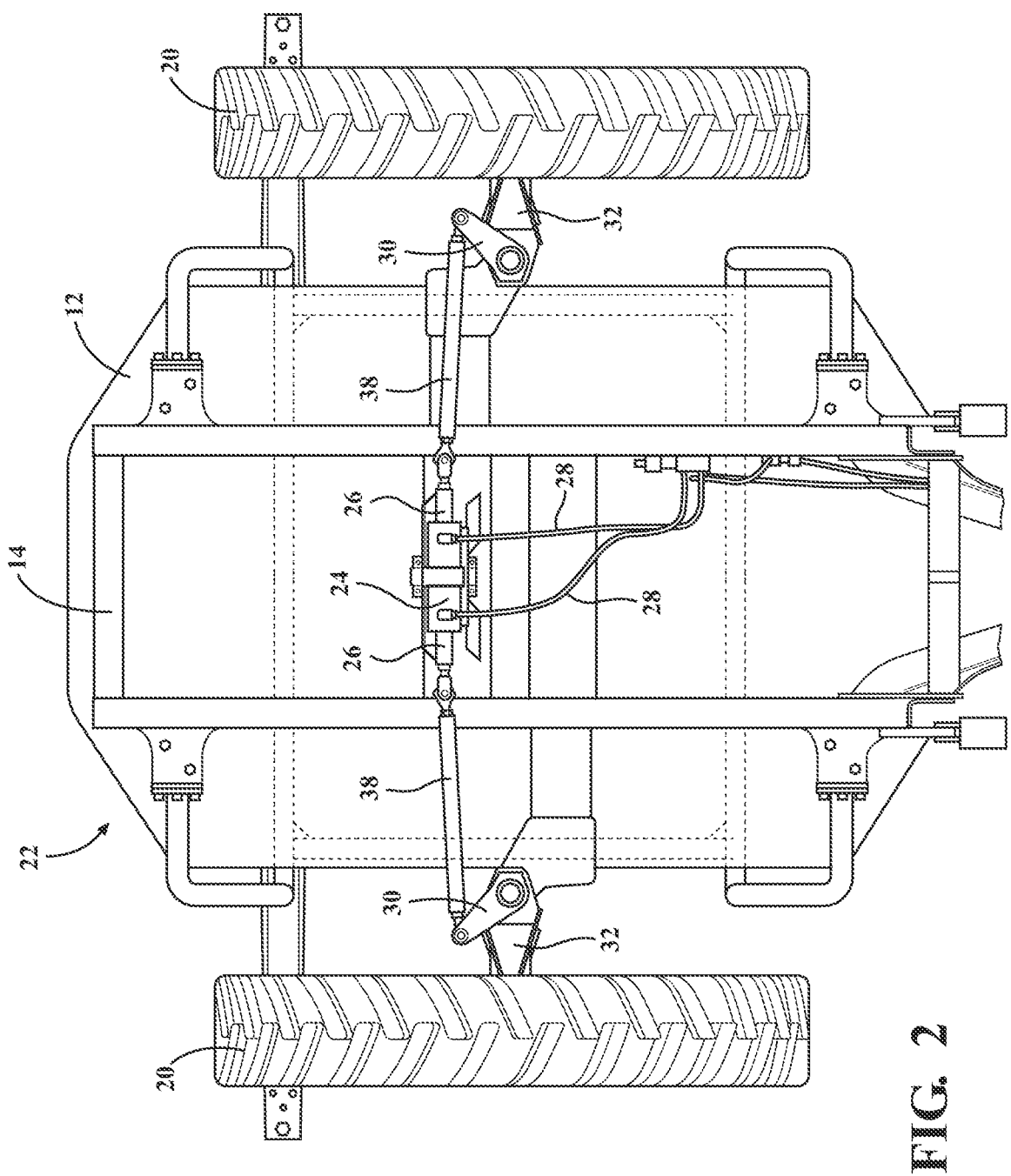
FIG. 2 is a bottom view of the steerable trailed implement of FIG. 1.
Figure 3:
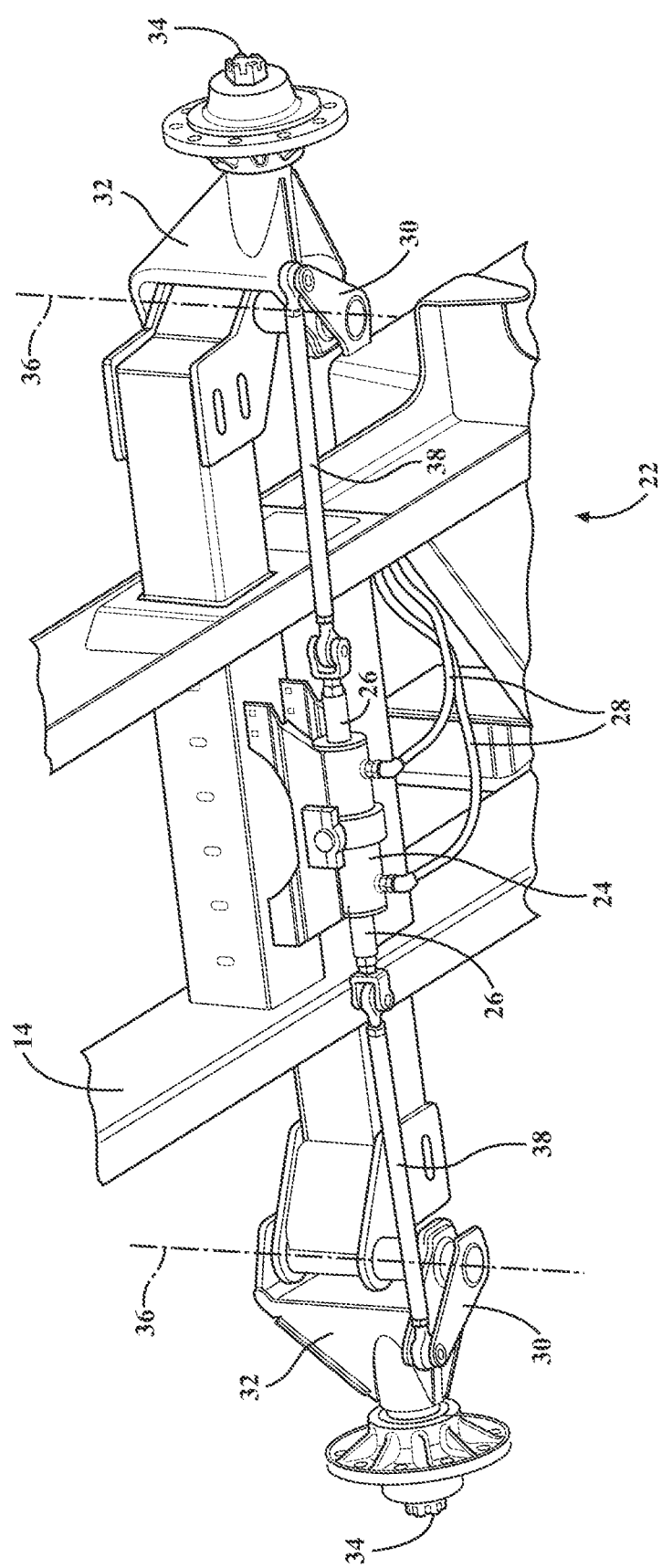
FIG. 3 is a perspective bottom view of the steerable axle on the trailed implement of FIGS. 1 and 2.

FIGS. 1-3 illustrate one embodiment of an agricultural implement configured as a steerable trailed implement 10. The trailed implement 10 includes a body 12 mounted on a frame 14. A toolbar 16 may be mounted on the implement 10 via a mounting arm 18. The trailed implement 10 also includes wheels 20 mounted on a steerable axle 22. Referring to FIGS. 2-3, the steerable axle 22 includes a double-ended hydraulic cylinder 24 mounted on the frame 14. The hydraulic cylinder 24 includes rods 26 extending from each end of the cylinder 24, and hydraulic hoses 28 through which hydraulic fluid flows to and from the cylinder 24 to control movement of the rods 26.

For each wheel 20 on the implement 10, the steerable axle 22 also includes a Pitman arm 30 having a first end fixedly mounted to a pivot arm 32. The pivot arm 32 is fixedly mounted to an axle 34. The pivot arm 32 also is pivotally mounted to the frame 14 along a pivot axis 36. Tie rods 38 connect each rod 26 to its corresponding Pitman arm 30. One end of the tie rod 38 is pivotably connected to the rod 26, and the other end of the tie rod 38 is pivotably connected to a second end of the Pitman arm 30 opposite the first end.

Figure 4:
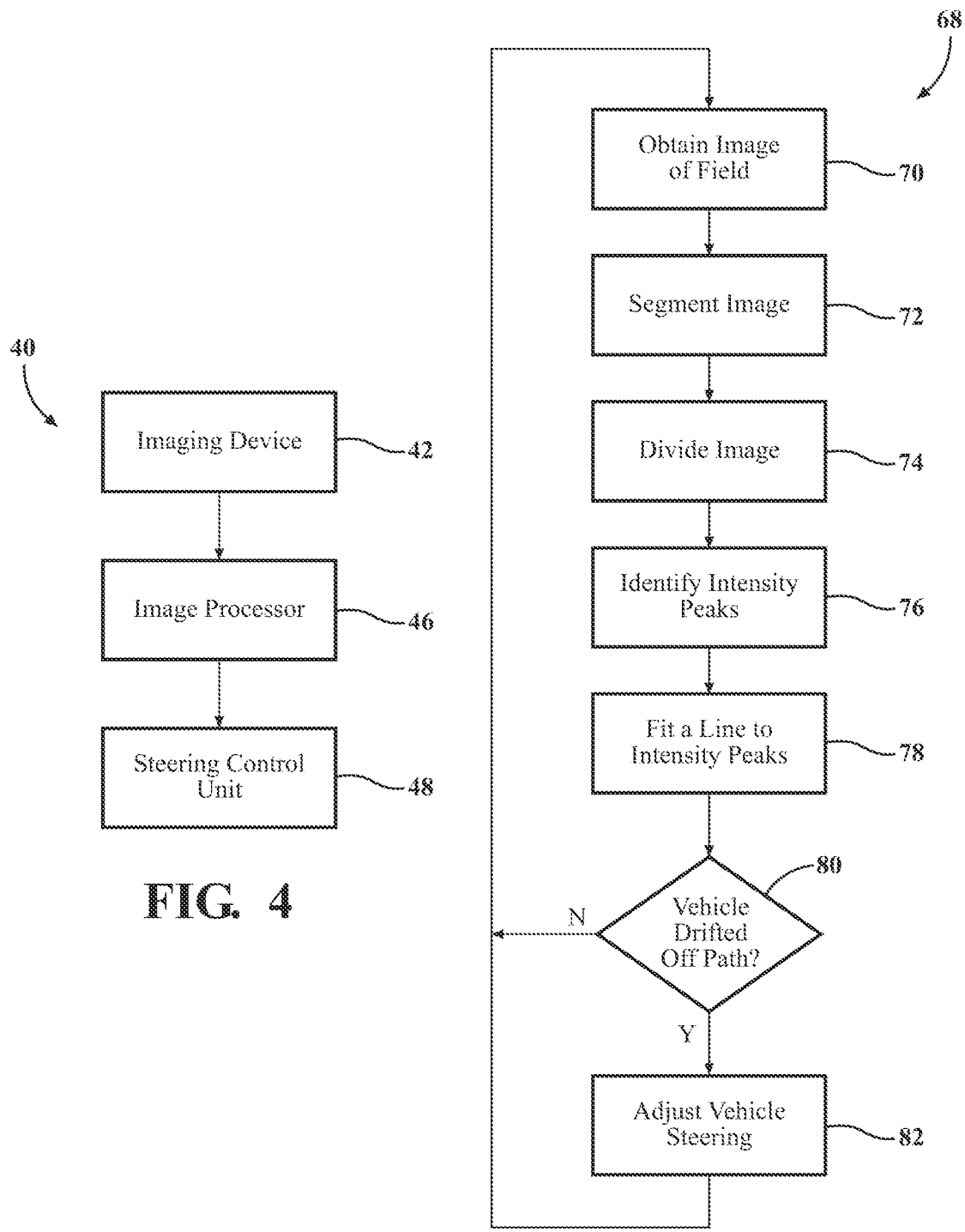
FIG. 4 is a block diagram of a vision guidance system for the steerable trailed implement.

Referring to FIGS. 1 and 4, the trailed implement 10 also includes a vision guidance system 40. The vision guidance system 40 includes an imaging device 42 (e.g., a camera) mounted on an arm 44. The arm 44 is mounted on the toolbar 16. Alternatively, the arm 44 may be mounted anywhere on the trailed implement 10. The vision guidance system 40 also includes an image processor 46 and a steering control unit 48. The imaging device 42 obtains images of the field as the trailed implement 10 is pulled through the field. The image processor 46 identifies rows within the images, and the steering control unit 48 adjusts the steering angle of the wheels 20 on the trailed implement 10 to ensure that the wheels 20 remain between the crop rows. Because the vision guidance system 40 identifies the crop rows based on an image of the field, there is no minimum plant height or size requirement as is necessary with a feeler whisker system as long as the plant can be visually detected.

Figure 5:
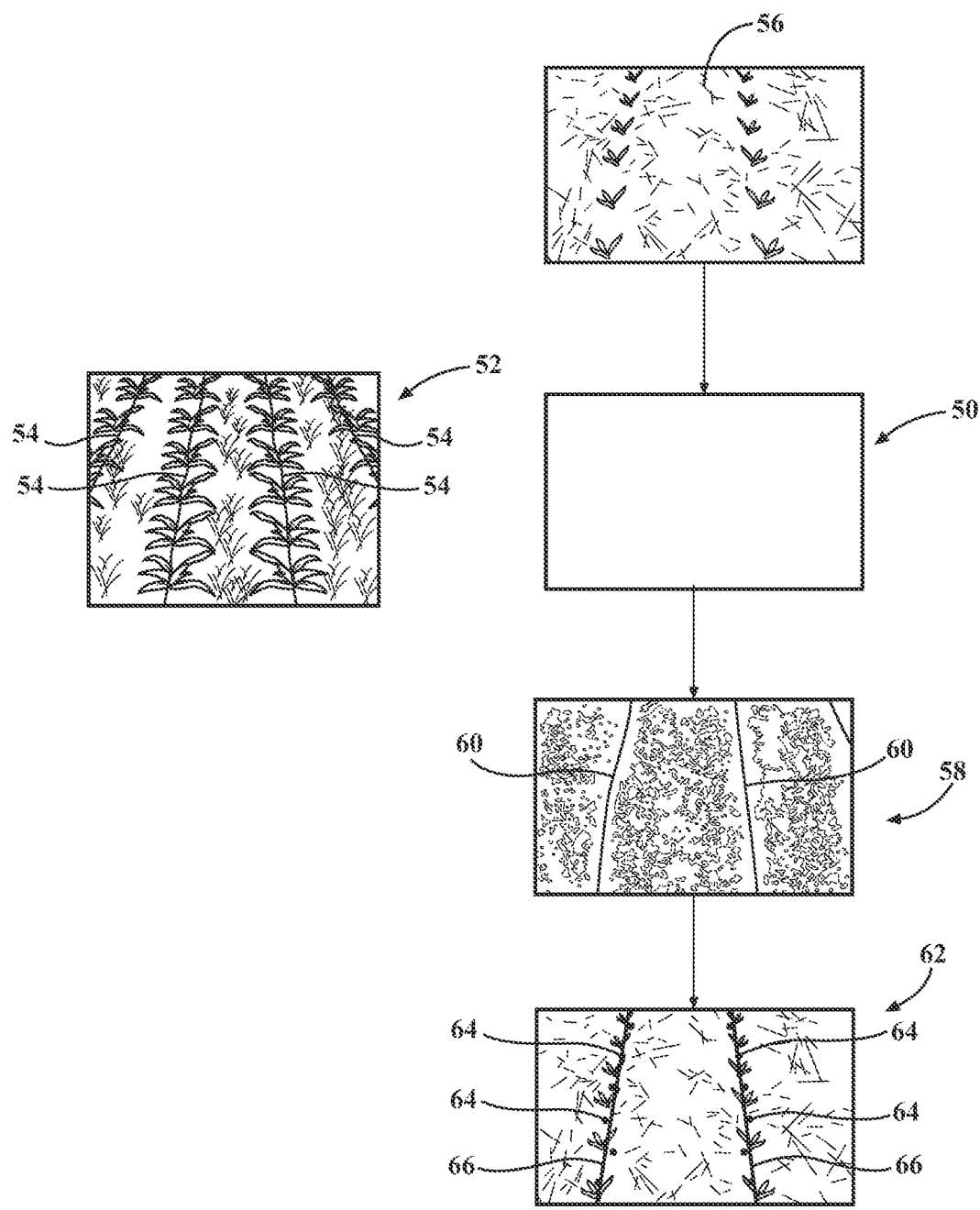
FIG. 5 is a flow diagram illustrating the processing performed on an image by the vision guidance system.

Referring to FIG. 5, the image processor 46 comprises a convolutional neural network based semantic segmentation model 50. The model 50 is trained using annotated images 52 of crop at various growth stages. The annotated images 52 include weak annotations 54 defining row positions on the images 52. Each weak annotation 54 comprises a line drawn above the crop row, and the model 50 is trained to infer larger scale row features in the image 52.

FIG. 6 illustrates the process 68 performed by the vision guidance system 40 while the trailed implement 10 is pulled through the field. Referring to FIGS. 5 and 6, the imaging device 42 obtains an image 56 of the field (step 70). The semantic segmentation model 50 segments the image 56

(step 72) to create a pixel-wise classification 58 of the image 56. The pixel-wise classification 58 distinguishes the crop rows 60 from the other parts of the plant and any other background information, including the soil and other plants that may be in the image 56. The image processor 46 applies a linear regression model to a kernel-based calculation of intensity peaks from the generated image mask. For example, the image processor 46 may divide the pixel-wise classification 58 into 6 rows and 2 columns (step 74), i.e., into 12 sections. Alternatively, rather than dividing the entire pixel-wise classification 58 into sections, the image processor 46 may focus on sections closer to the classified rows 60. The number of columns selected depends on the number of crop rows being analyzed. The image processor 46 identifies the intensity peak 64 within each section (step 76) by identifying the point with the highest number of crop row pixels across the width of each section. The intensity peaks 64 correspond to the center of the crop row within each section. The image processor 46 applies a linear regression model to the intensity peaks 64 to create regression lines 66 representing the crop rows in the image 62 (step 78). The regression line 66 can be used to calculate the position and orientation of the trailed implement 10 relative to the position of the imaging device 42 and the crop row. If the vision guidance system 40 determines that the trailed implement 10 is drifting toward a crop row (step 80), the steering control unit 48 will adjust the steering of the implement 10 to compensate for the drift (step 82). The steering control unit 48 adjusts the steering of the implement 10 using the steerable axle 22 to adjust the angle of the wheels 20 according to Ackermann (or similar) steering geometry. The vision guidance system 40 uses feedback to constantly adjust the steering angle to keep the trailed implement 10 centered on the rows.

At the end of a row, the operator will raise the toolbar 16 out of the crop to turn. When the vision guidance system 40 detects that the toolbar 16 is raised, it will recenter the vehicle steering so that the wheels 20 are in the correct position when the implement 10 is pulled through the next crop row. GPS sensors also may be used to allow the implement 10 to follow the tractor's path when turning through standing crop on headlands to reduce crop damage. The steering functionality may be turned off for transport or other purposes.

Figure 7:
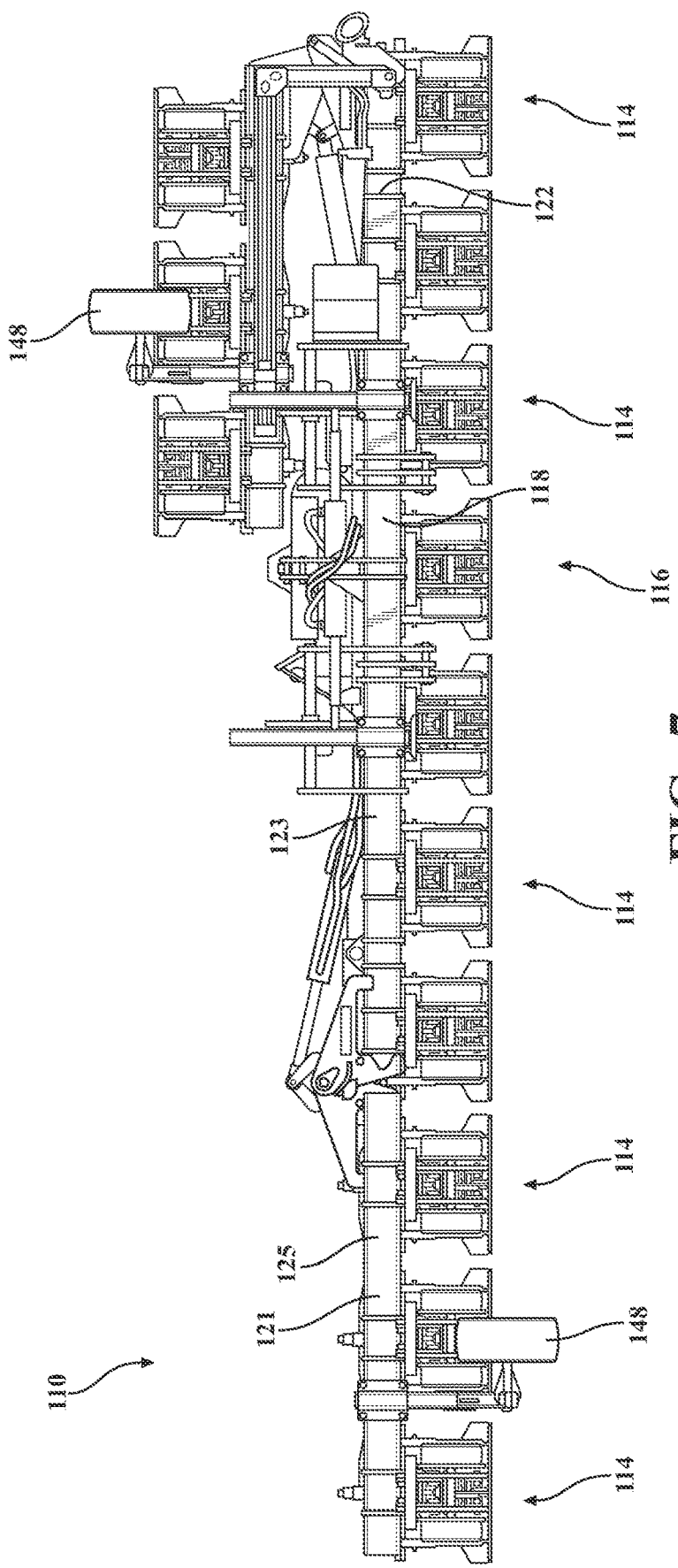
FIG. 7 is a front elevation view of a row crop cultivator including a vision guidance system according the present invention.
Figure 8:
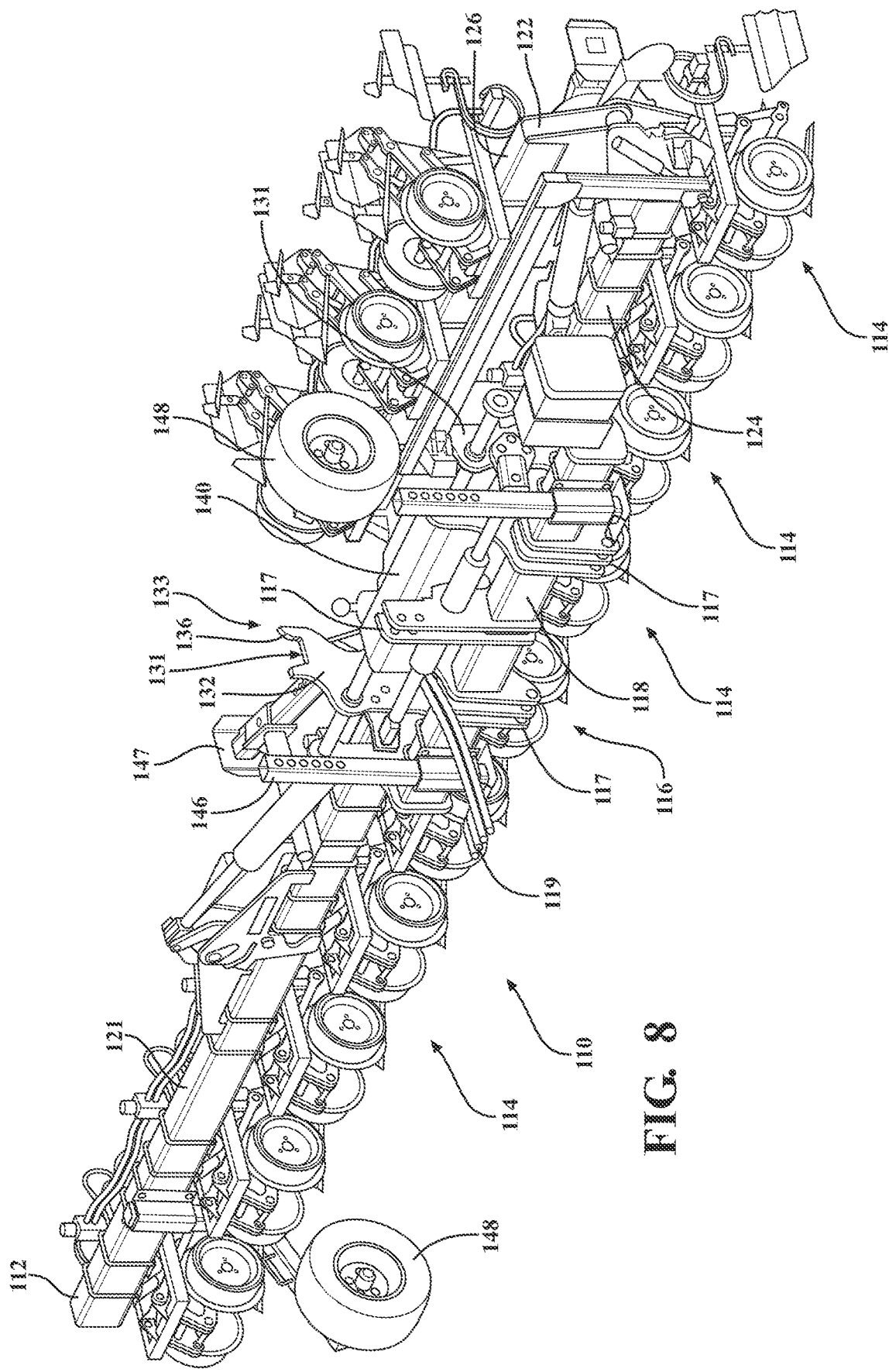
FIG. 8 is a front perspective view thereof.

In a further embodiment of an agricultural implement, FIG. 7 is a front elevation view of a precision row crop cultivator 110 including a vision guidance system 40 according the present invention. FIG. 8 is a front perspective view thereof. The precision cultivator 110 is configured and improved to permit farmers and the like to cultivate as close to the crop rows as possible without damage, while also performing this operation at a relatively high speed since the vision guidance system 40 is able to monitor and identify the path of each crop row identified within the field of vision encompassed within the acquired image 56 and then adjust the lateral position of the cultivator 110. While the cultivator 110 or other implements may span multiple rows for each pass, the vision guidance system 40 acquires images 56 from a selected segment of such rows and the cultivator can be centered based upon the representative segment of rows that are analyzed.

Generally, the cultivator 110 includes a toolbar 112 having a plurality of row units 114 provided in laterally spaced relation on their respective toolbar 112 to work the soil or ground in the spaces between rows. This cultivator 110 is particularly suitable for cultivating between rows of standing crops by engagement of the row units 114 with the ground, while avoiding damage to the crops, which is a risk associated with operating the row units 114 close to the crop rows. As noted, the vision guidance system 40 is able to analyze and assess the path and spacing of each crop row in the field of vision of the vision guidance system 40, and is able to use this vision data to accurately adjust the lateral position of the row units 114. This accuracy is accomplished through incorporation of the inventive vision guidance system 40 into the row crop cultivator 110, wherein the cultivator 110 is configured to include a laterally-shiftable toolbar 112. This allows the vision guidance system 40 to identify the path of each row and then the toolbar 112 can be shifted as required during the cultivation process to maintain the row units 114 on the toolbar in the desired position between adjacent rows.

The toolbar 112 may be releasably attached to a 3-point hitch of a towing vehicle such as a tractor by a main mounting assembly 116. The main mounting assembly 116 includes a configuration of hitch mounting brackets 117 configured in a conventional 3-point hitch arrangement. The hitch mounting brackets 117 support a main beam 118, wherein the main beam 118 essentially is held in a laterally fixed position when the cultivator 110 is mounted to a tractor. The toolbar 112 in turn is laterally shiftable relative to the main beam 118 as described further below. Suitable hydraulic pressure lines 119 also are provided on the main mounting assembly 116, which supply pressurized fluid for operating various pressure cylinders on the cultivator 110. The pressure lines 19 are fed and controlled by a fluid supply received from the tractor.

The toolbar 112 generally comprises left and right toolbar wings 121 and 122. The toolbar 112 preferably is formed in a multi-segment configuration, wherein each of the toolbar wings 121 and 122 is configured to fold for transport or extend for field operations. In this regard, the toolbar 112 thereby comprises interior wing segments 123 and 124 and distal wing segments 125 and 126. The interior wing segments 123 and 124 preferably are formed in a single piece by the opposite ends of a central beam section, wherein this central beam section is slidably supported by the main beam 118 on the main tractor mounting assembly 116 and is shiftable laterally relative thereto. As such, the interior wing segments 123 and 124 are shiftable laterally together relative to the stationary main beam 118 so that the lateral position of all of the row units 114 can move together in unison. However, if desired, the interior wing segments 123 and 124 could be formed separate from each other without departing from the present invention. Further, the toolbar 112 may also take the form of a crossbeam on other types of implements which might require a laterally shiftable crossbeam.

Figure 9:
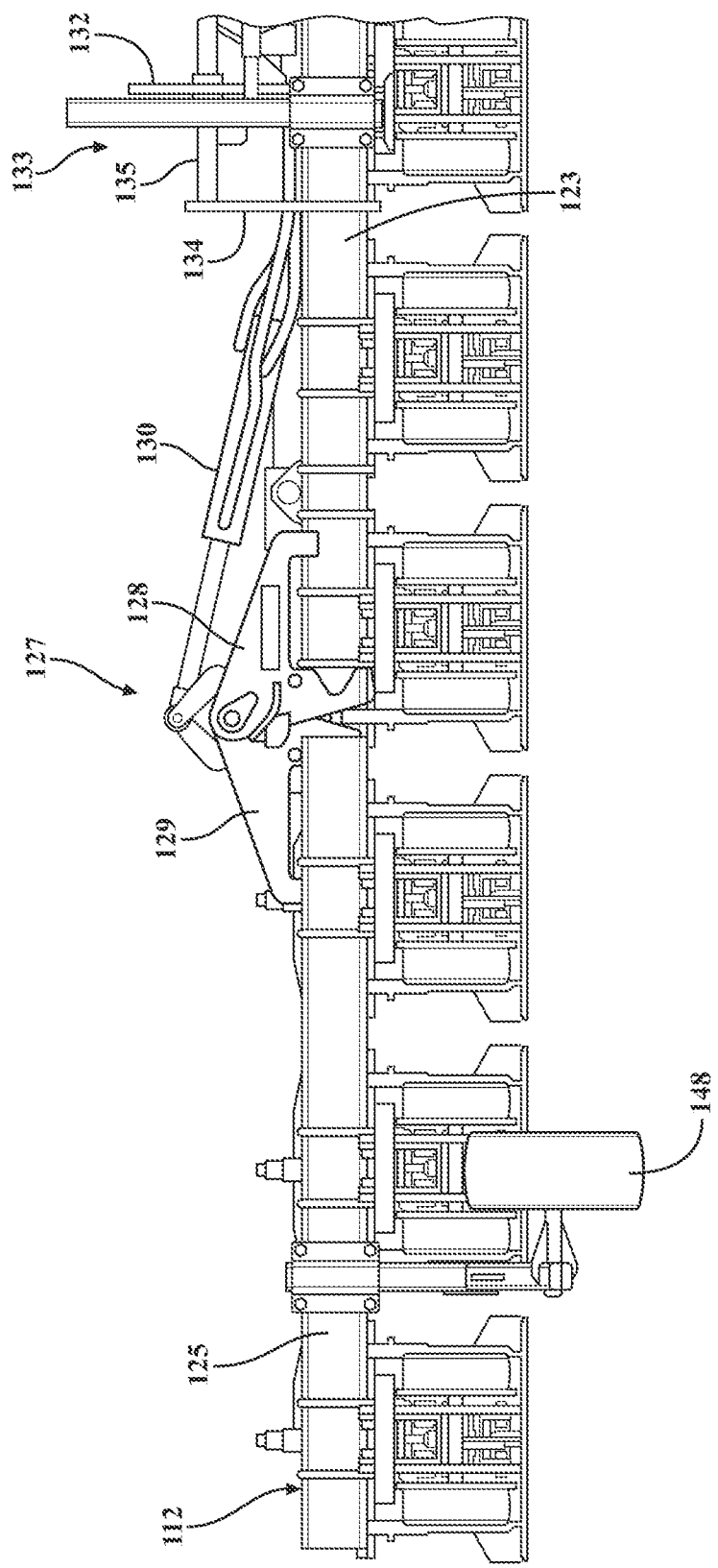
FIG. 9 is an enlarged front view showing the cultivator extended in a field mode.
Figure 10:
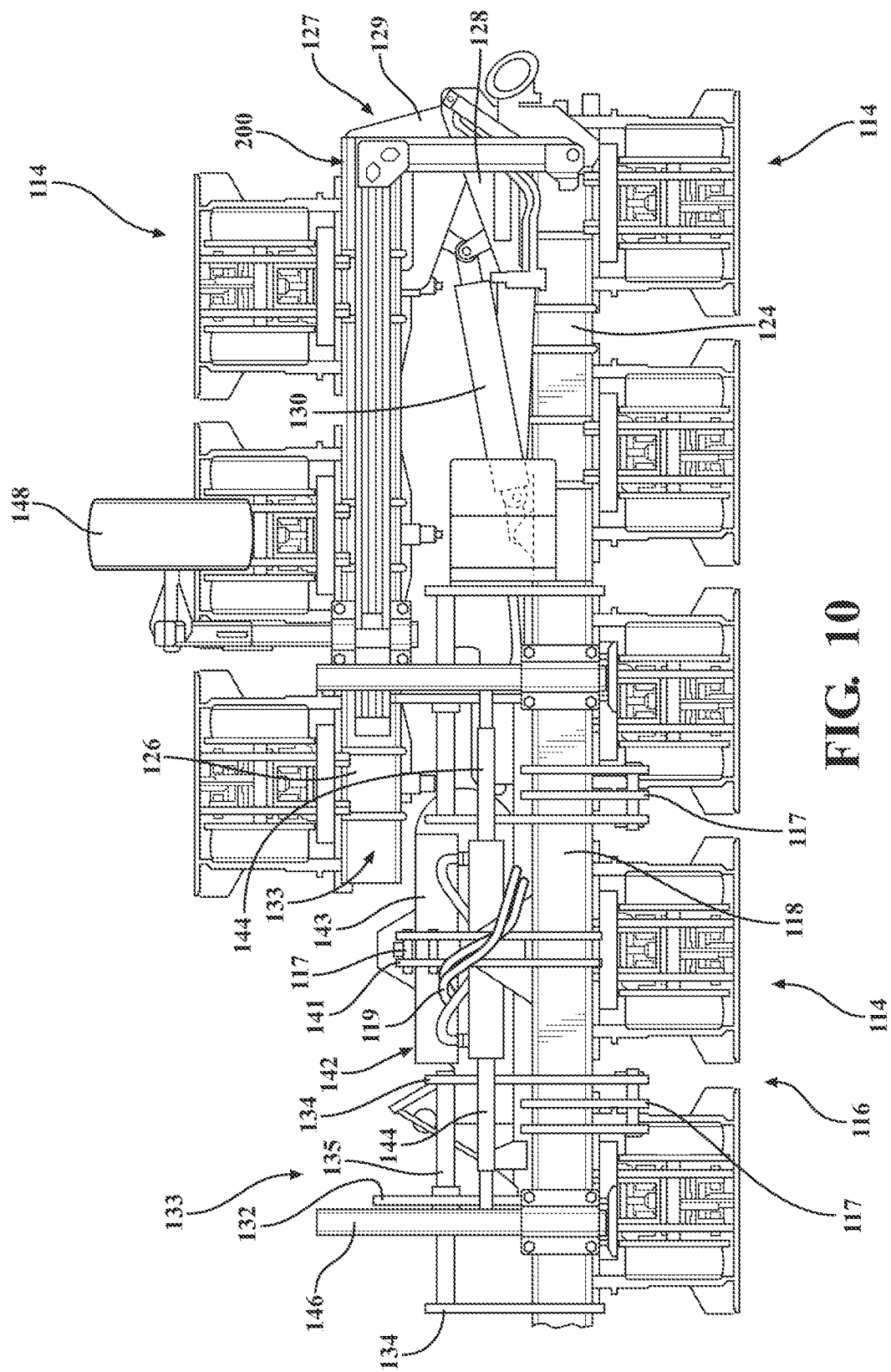
FIG. 10 is an enlarged front view showing the cultivator folded into a transport mode.

The distal wing segments 125 and 126 are hingedly connected to the interior wing segments 123 and 124 to permit their vertical folding movement about a horizontal pivot axis. In this regard, FIGS. 7 and 9 show the left side of the cultivator 110 with the cultivator toolbar 112 extended in a field mode so that the row units 114 are positioned for field cultivation. FIGS. 8 and 10 show the right side of the cultivator 110 with the distal wing segment 126 folded over and onto the stationary interior wing segment 124 in a transport mode.

Referring further to FIGS. 9 and 10, each of the interior wing segments 123 and 124 and the distal wing segments 125 and 126 include respective hinge assemblies 127 comprising hinge brackets 128 and 129 that pivotally join the distal wing segments 125 and 126 to their respective interior wing segments 123 and 124. Each hinge assembly 127 also comprises an actuator 130, preferably formed as a hydraulic cylinder that is controlled by the tractor control system. In this configuration, both distal wing segments 125 and 126 can be folded up to the transport mode for transport in the manner shown in FIGS. 8 and 10, and then unfolded down into the field mode for field cultivation. If desired, the distal wing segments 125 and 126 may also displace vertically during field operations so that the toolbar 112 effectively flexes to follow ground contours.

Figure 11:
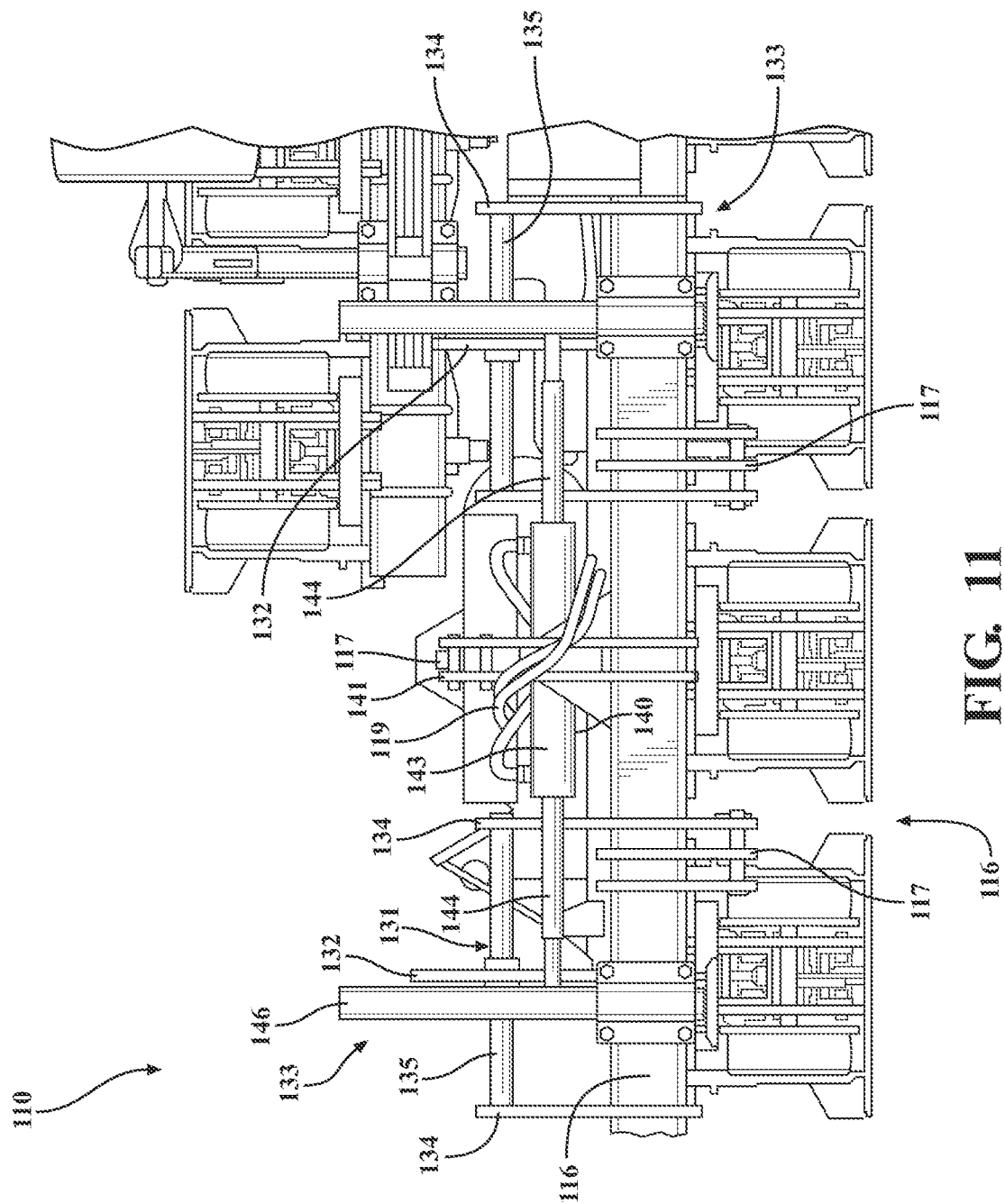
FIG. 11 is a front view further enlarged to show the main mounting assembly for the cultivator.
Figure 12:
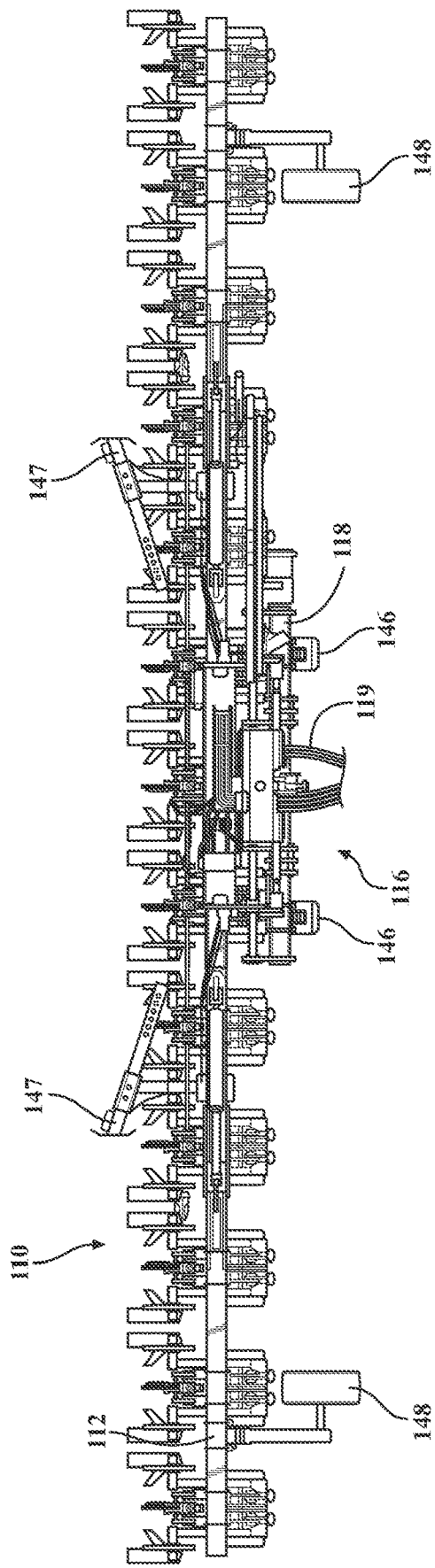
FIG. 12 is a top view thereof.
Figure 13:
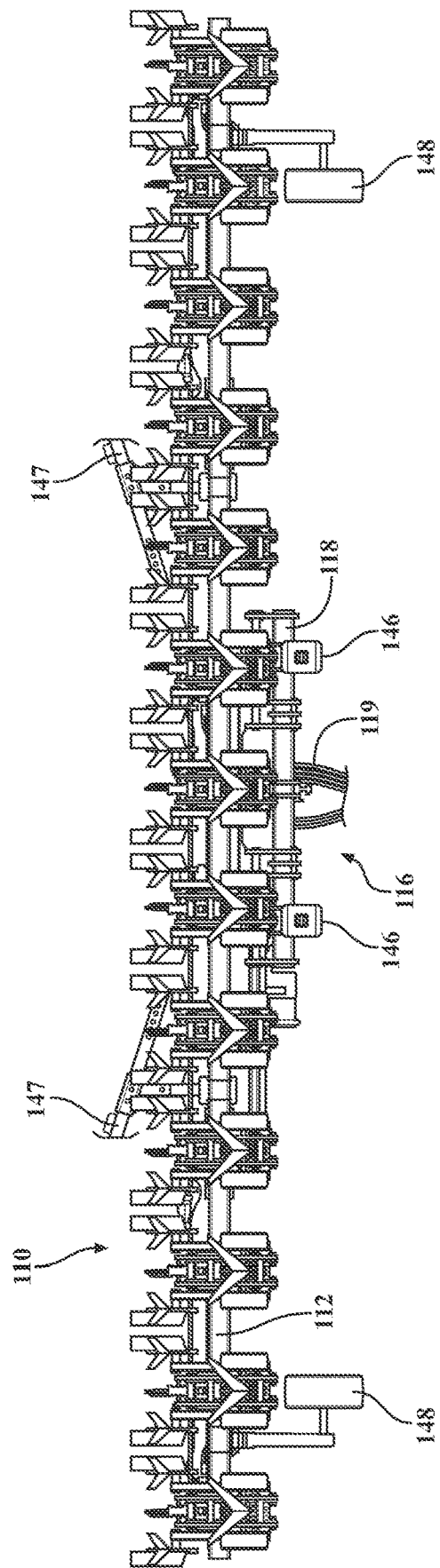
FIG. 13 is a bottom view thereof.
Figure 14:
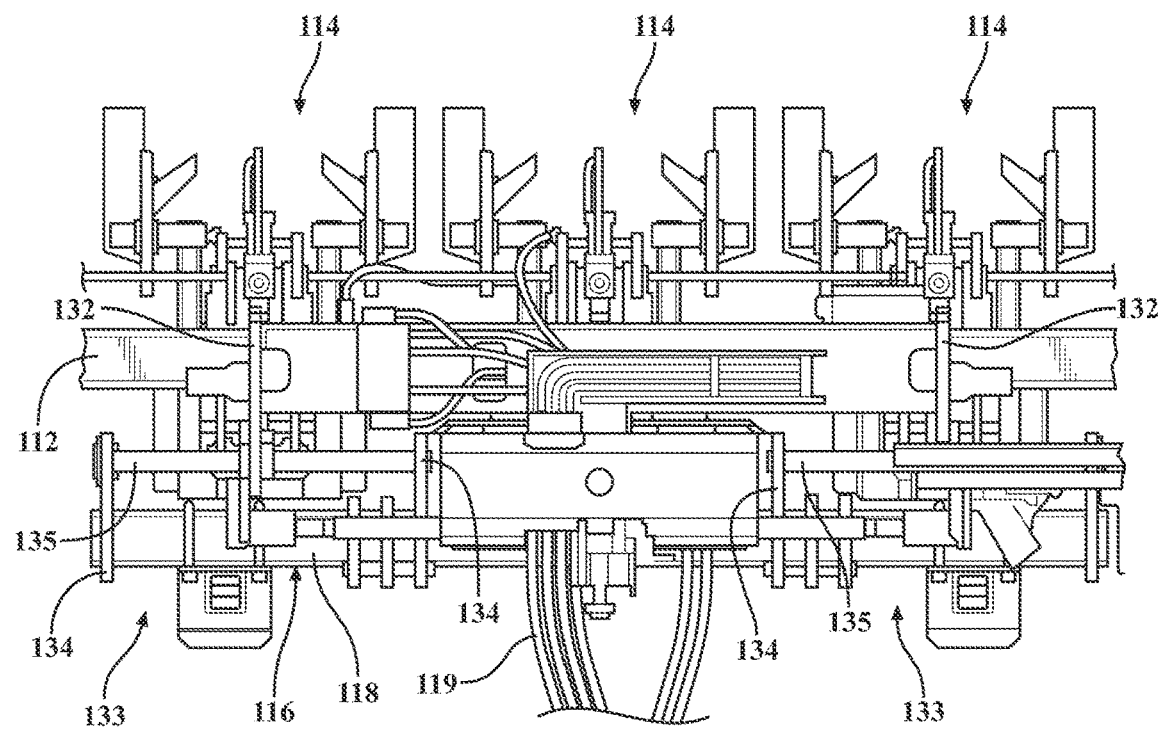
FIG. 14 is an enlarged top view of the main mounting assembly.
Figure 15:
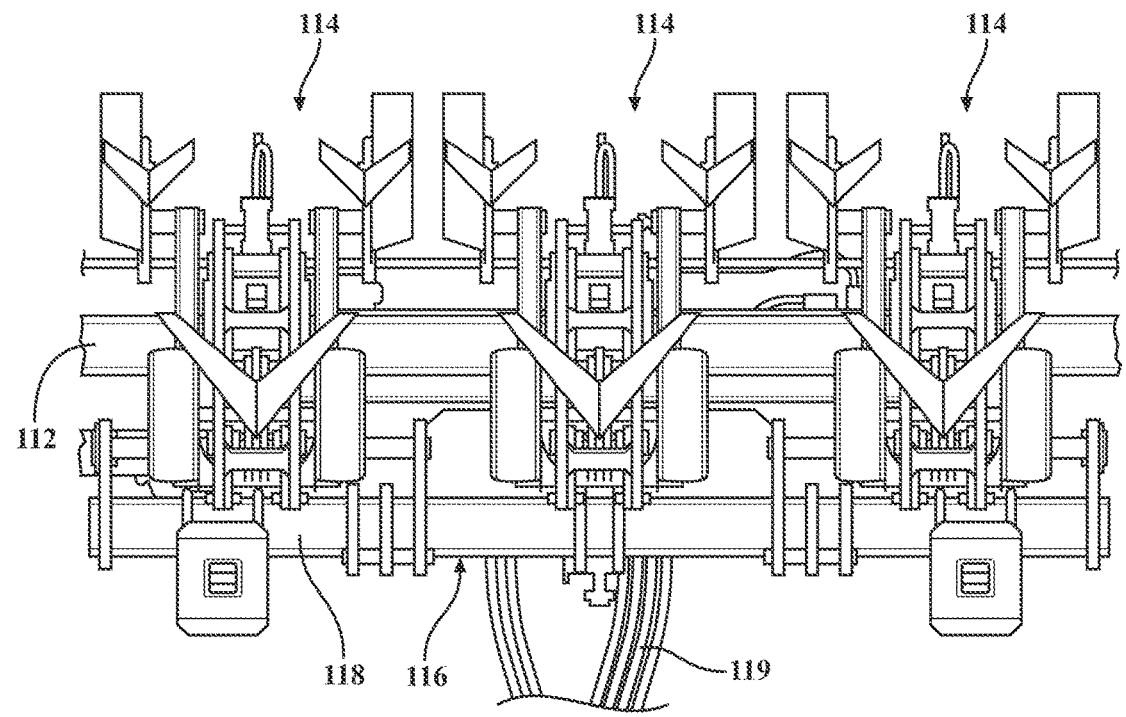
FIG. 15 is an enlarged bottom view thereof.

Next as to the main mounting assembly 116, FIGS. 11-13 show the main mounting assembly 116 with the main beam 118 and hitch mounting brackets 117 rigidly joined thereto. The 3-point hitch fixes the lateral position of the main beam 118 relative to the tractor or other towing implement as noted above. However, the toolbar 112 is laterally shiftable as discussed in more detail below.

To support the toolbar 112 on the main beam 118, one or more bracket assemblies 131 are mounted between the main beam 118 and toolbar 112. Each of the bracket assemblies 131 comprises a support bracket 132 rigidly supported on the toolbar 112, and a slide assembly 133 rigidly supported on the main beam 118. The toolbar 112 and support bracket 132 can slide laterally along the slide assembly 133. These components also may be reversed without departing from the scope of the present invention.

The slide assembly 133 comprises end plates 134 and a horizontal slide rail 135 extending therebetween. The slide rail 135 preferably has a tubular profile and slidably supports the support bracket 132 so that the support bracket 132 can slide laterally or sideways along the slide rail 135 and thereby move the toolbar 112 laterally. Each support bracket 132 also may include an upward opening cradle 136 that supports the distal wing segments 125 or 126 when folded.

The main mounting assembly 116 further comprises a drive assembly 140 having a drive support bracket 141 mounted on the main beam 118 as best seen in FIGS. 10 and 11. The drive support bracket 141 includes a drive actuator 142 preferably formed as a double-ended pressure cylinder comprising a central cylinder housing 143 and drive rods, or pistons, 144 at opposite ends that are extendable and retractable to thereby shift the toolbar 112. In particular, the drive rods 144 connect to the support brackets 132 wherein the movement of the drive rods 144 in turn move the support brackets 132 and interconnected toolbar 112 laterally as desired. In this manner, the toolbar 112 and its row units 114 can be shifted laterally by operation of the drive assembly 140 to displace the toolbar 112 leftwardly and rightwardly during field operations in response to command and control from the vision guidance system 40.

As seen in FIGS. 12 and 13, the main mounting assembly 116 may also include extendible feet 146 for supporting the cultivator 110 when detached from a tractor. Similarly, the toolbar 112 may include additional feet 147 for this purpose. To provide further support to the toolbar 112, the toolbar 112 may also include wheel assemblies 148 at the opposite ends thereof.

Next, as noted above, the toolbar 112 includes a plurality of laterally spaced row units 114 that are fixedly attached to the toolbar 112 along the length thereof. The spacing of the row units 114 corresponds to the spacing of the crop rows so that each row unit 114 can travel along the space between adjacent rows. The row units 114 may be formed the same as each other such that the following description is directed to a representative row unit 114.

Figure 16:
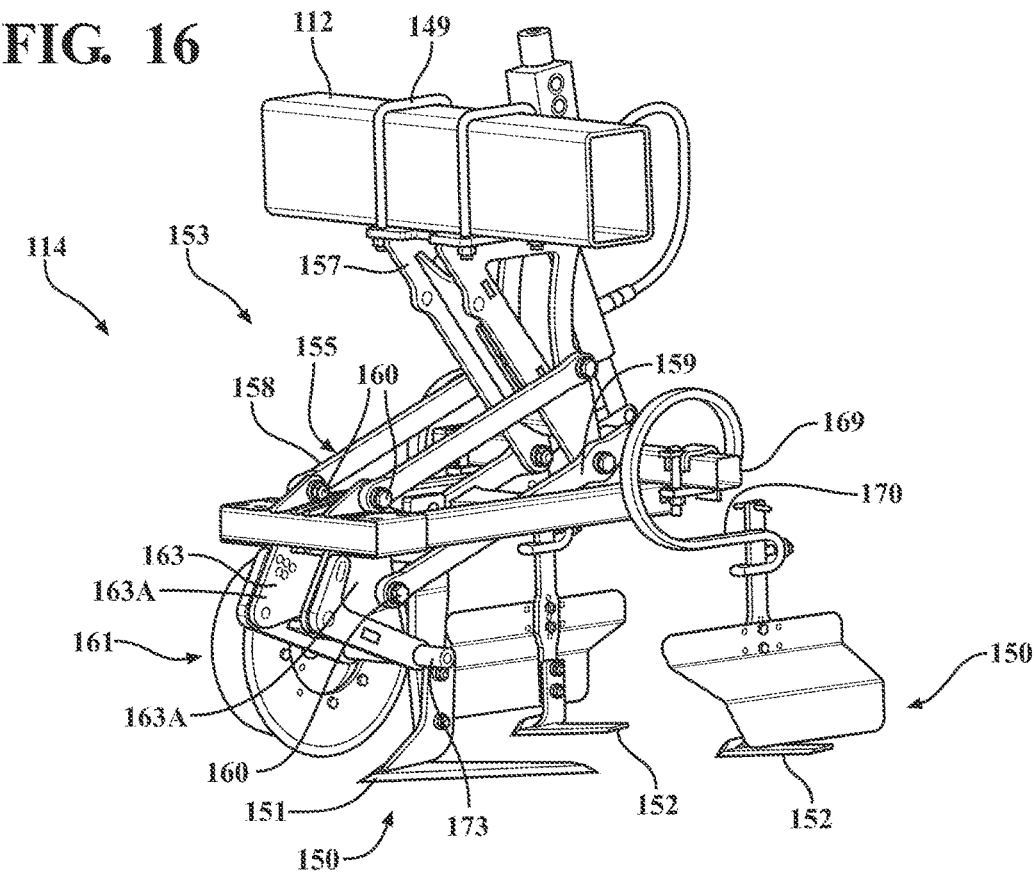
FIG. 16 is a perspective view of a representative row unit mounted on a toolbar of the cultivator.
Figure 17A:
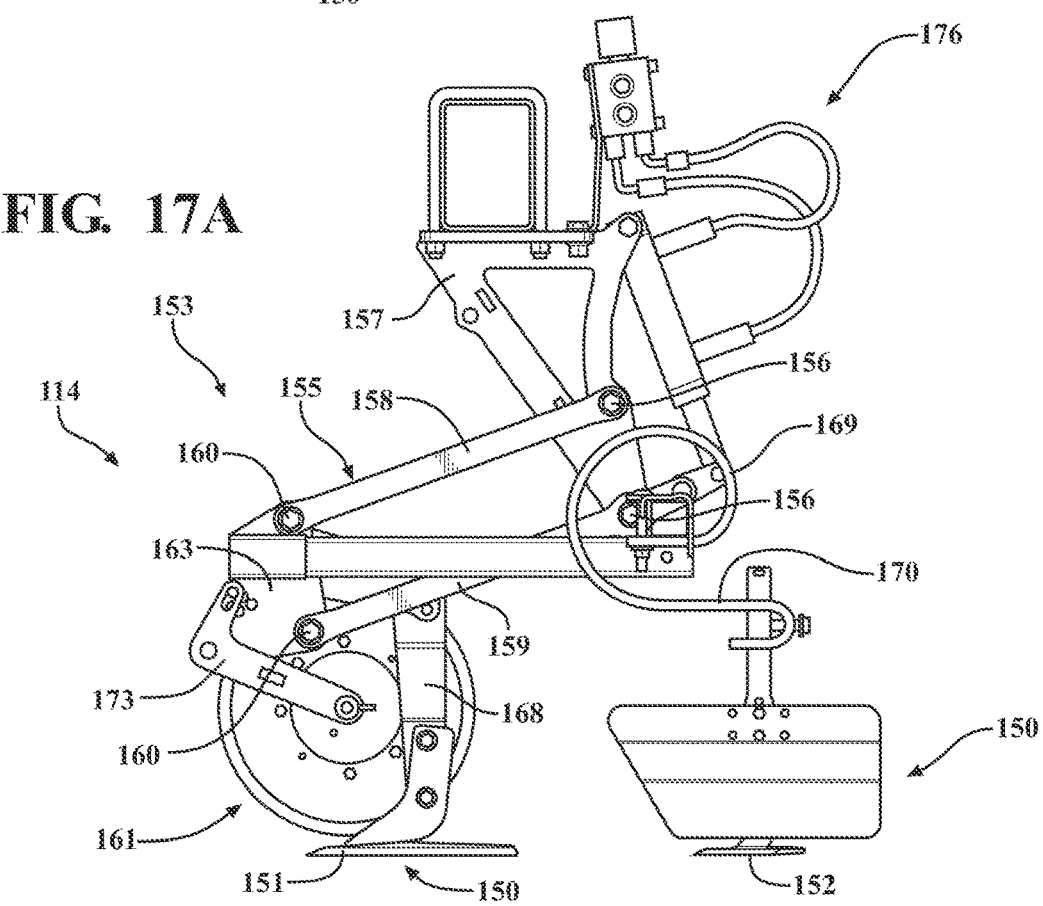
FIG. 17A is a side view of the row unit.
Figure 17B:
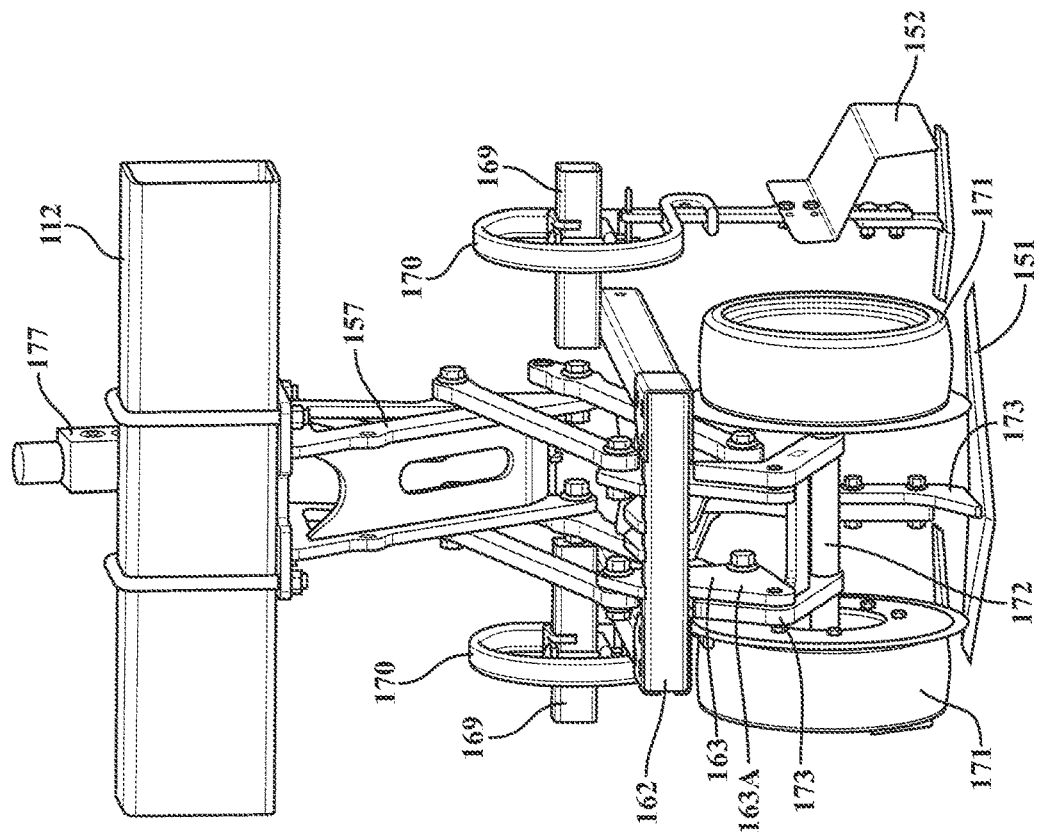
FIG. 17B is an alternate perspective view of the row unit of FIGS. 16 and 17A.

FIGS. 16 and 17 show the representative row unit 114 mounted on the toolbar 112 by suitable clamps 149 or other mounting structures. Each row unit 114 preferably comprises one or more cutting devices 151, such as ground-engaging, leading and following sweeps 151 and 152 or the like. Leading cutting device 151 may be mounted on a support linkage 153 that permits independent, vertical movement of the cutting device 151 relative to the toolbar 112 as well as the other row units 114.

Generally, the cutting devices 151 and 152 are formed as sweeps or blades that cut into the ground and effect cultivation of the spaces between the crop rows. This helps resist or prevent weed growth even when standing crops are being cultivated. It will be understood that other types of agricultural devices may be used in the row units 114 in place of the cutting devices 151 and 152 shown herein.

In one aspect of the invention, ground engagement by the cutting devices 151 is improved by support linkage 153, which preferably is formed as a four-bar linkage 155 that allows the cutting devices 151 and 152 to float relative to the toolbar 112. The support linkage 153 includes fixed pivots 156 attached to a downwardly extending support frame 157 that is supported on or fixed to the toolbar 112. The support frame 157 angles rearwardly as it depends downwardly from the toolbar 112 as best seen in FIG. 17, which positions the fixed pivots 156 generally below and toward the rear edge of the toolbar 112.

The fixed pivots 156 rotatably support at least one parallel pair of pivot links 158 and 159, which extend forwardly away from the fixed pivots 156 and define floating pivots 160 that pivotally support a cutter assembly 161 thereon. The cutter assembly 161 includes a cutter frame 162 formed in a rectangular shape with a front bracket 163 pivotally connected to the floating pivots 160. At least two pivot links 158 and 159 are provided as seen in the side view of FIG. 17, although preferably, two pairs of pivot links 158 and 159 are provided in sidewardly spaced relation as seen in FIG. 16. The front bracket 163 therefore may comprise two bracket plates 163A that respectively connect to a respective pair of the pivot links 158 and 159 by floating pivots 160.

The front bracket 163, pivot links 158 and 159 and support frame 157 effectively define a four-bar linkage supporting the cutter frame 162 on the toolbar 112. As such, the cutting devices 151 provided on the cutter frame 162 effectively are supported on the floating ends of the pivot links 158 and 159 so that the cutting devices 151 can float vertically relative to the toolbar 112 and the fixed pivots 156 supported thereon. In other words, the support linkage 153 preferably may be configured with a leading parallel linkage design that has the floating pivots 160 located ahead of the fixed pivots 156 as described so that the row units 114 naturally engage the ground while also having a compact structure. This configuration also eliminates the need for lift assist wheels and the like.

The cutter frame 162 supports the cutting devices 151 as referenced above, wherein a single leading sweep 151 may be fixed in place by a mounting bracket 168. The cutting devices 150 may also comprise a pair of following or trailing sweeps 152, which are supported on rear crossbars 169 of the cutter frame 162 by respective S-tine shanks 170, which are resiliently deflectable.

The front of the cutter frame 162 may also comprise a pair of wheels 171 rotatable on a common axle 172, wherein the axle 172 is supported on the cutter frame 162 by arms 173. The arms 173 may pivotally connect to the bracket plates 163A forming the front bracket 163 on the cutter frame 162 to allow the height of the wheels 171 to be adjusted and then fixed in position to thereby limit the depth of penetration of the cutting devices 151 and 152 into the ground during field cultivation.

Overall, this configuration provides for a compact design for the row units 114 using the leading parallel arm linkage, which promotes better ground following in a compact unit. As such, this allows for larger 3-point cultivators without requiring lift assist wheels.

Figure 18:
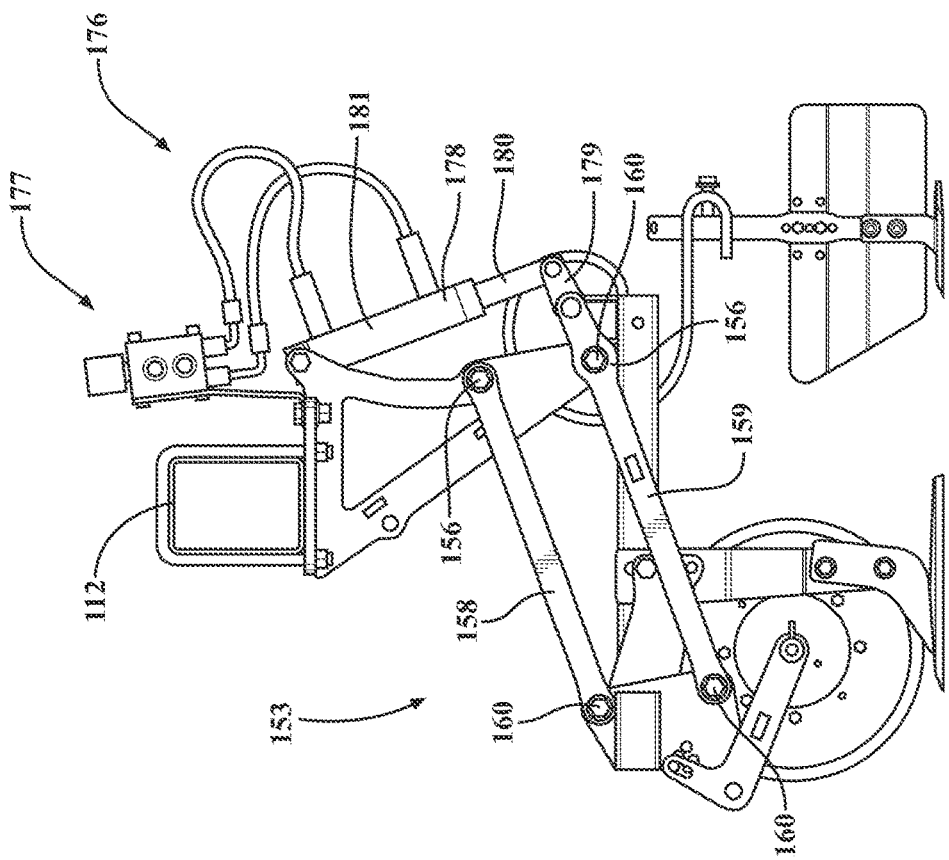
FIG. 18 is an enlarged view of the actuator assembly for controlling the row unit.
Figure 19:
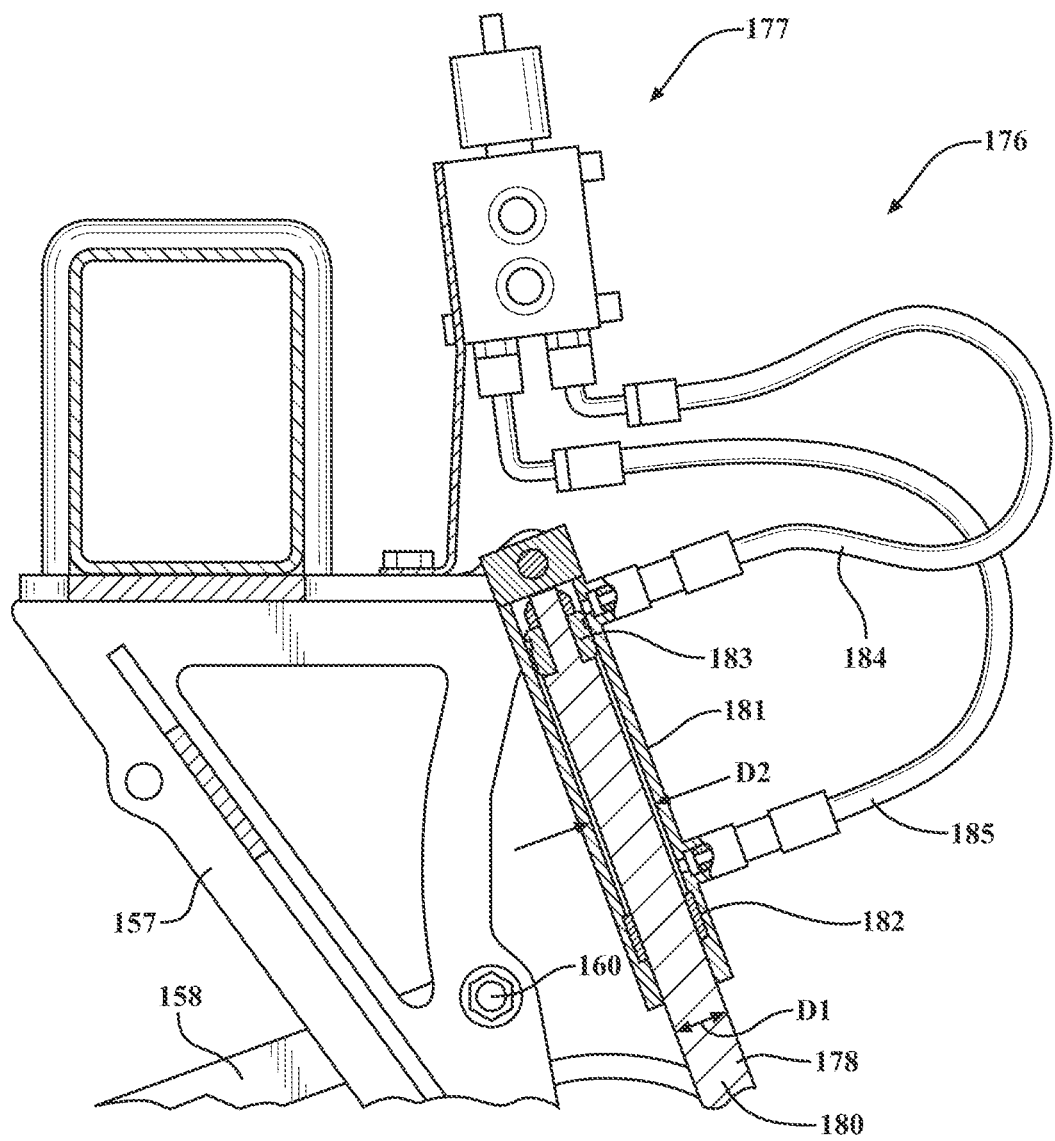
FIG. 19 is a side cross sectional view of the actuator assembly.

To further ensure ground following by the row units 114, each row unit 114 may include an actuator 176 as seen in FIGS. 18 and 19 that can connect to the support linkage 153 and can be operated to adjust the down force on cutting devices 151 of the row unit 114. The actuator 176 may also be operated to lift the row unit 114 when operating in areas that might be partially cultivated or otherwise require lifting of the row unit 114. Each actuator 176 may be operated independent of or together with the actuators 176 of other row units 114.

In more detail, the actuator 176 preferably comprises a control valve 177, and a hydraulic pressure drive cylinder 178, which operate to drive the support linkage 153. In this regard, the bottom pivot links 159 preferably have a control arm 179 at the rear ends thereof, which extends rearwardly beyond the fixed pivots 156 as seen in FIG. 18. In one preferred configuration, the pivot links 159 can extend rearwardly beyond the fixed pivots 156 and rigidly support a cross rod that in turn supports the control arm 179 centrally along the length thereof. The control arm 179 extends radially rearwardly from the cross rod and pivotally connects to the piston rod 180 of the drive cylinder 178. The piston rod 180 telescopes into and out of the cylinder body 181, wherein extension and retraction of the piston rod 180 can rotate the control arm 179 and thereby drive rotation of the pivot links 159 to raise and lower the cutting devices 150 or adjust the down force on the cutting devices 150.

As best seen in FIG. 19, the cylinder body 181 includes a cylinder bore 182 in which the piston rod 180 is slidably received. The piston rod 180 further comprises a piston 183 that sealingly engages the cylinder bore 182 and defines pressure chambers on the opposite sides of the piston 183. The pressure chambers communicate with pressure hoses 184 and 185, which in turn are selectively pressurized and depressurized by the control valve 177 to extend and retract the piston rod 180. Preferably, the piston rod 180 has a rod diameter D1 that is proximate to but smaller than the bore diameter D2 so that the ratio of the diameters D1/D2 and the ratio of the bore area/rod area are large or close to one, which provides for efficient operation of the drive cylinder 178. This provides a force advantage in extension over retraction.

The cylinder ratio is designed so that a set downforce pressure can also be used for lifting of the row unit 114 during section control through use of the control valve 177, which is a basic two position directional control valve. The drive cylinder 178 is configured to lift the row unit 114 during extension of the piston rod 180 by using the force advantage of the drive cylinder 180 during extension.

Figure 20:
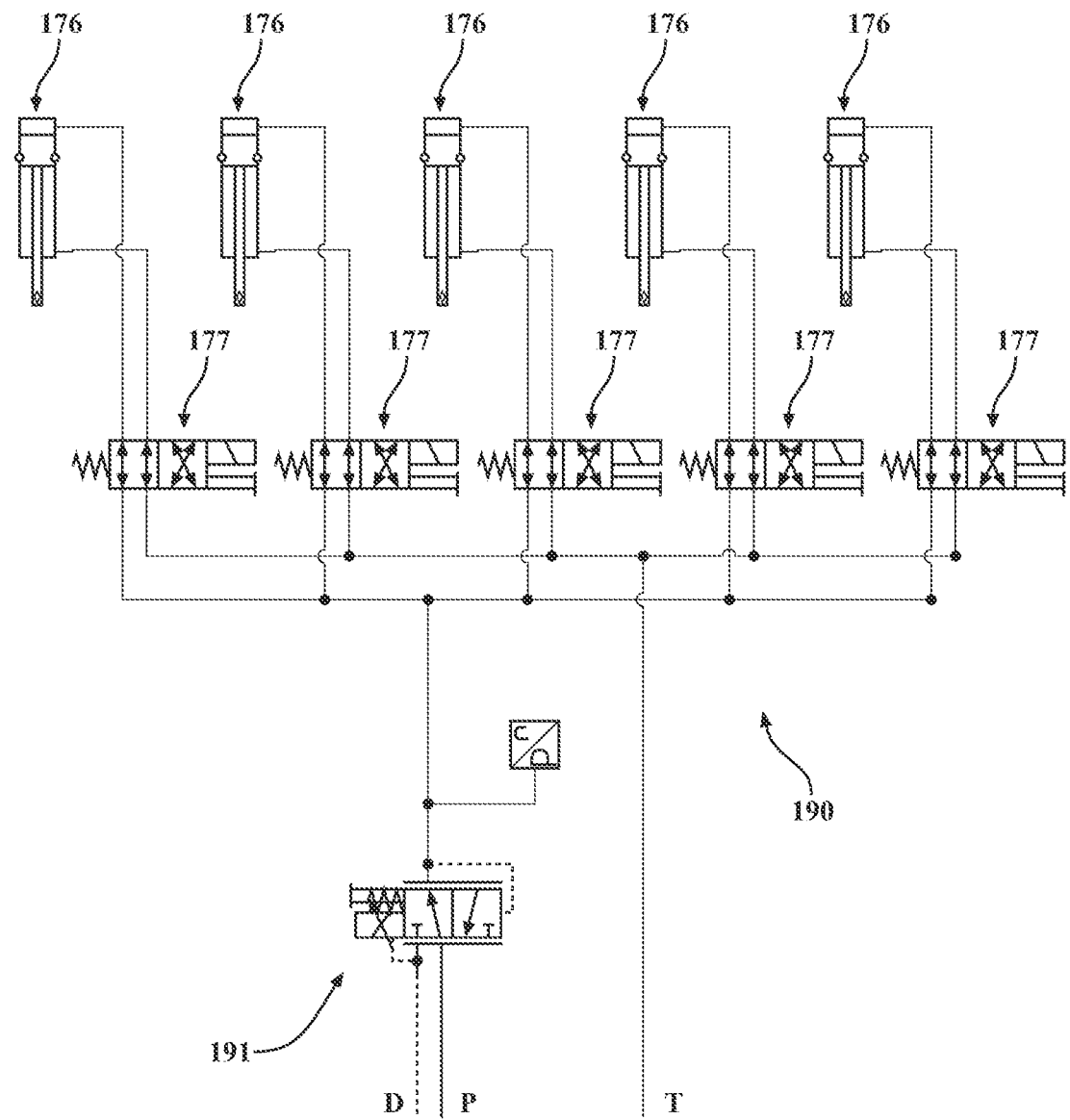
FIG. 20 is a schematic view of the hydraulic control system for driving the actuator assemblies of multiple row units.

To operate the actuators 176 of the multiple row units 114, FIG. 20 is a schematic view of the hydraulic control system 190 for driving the actuators 176 of multiple row units 114. The control system 190 may include a system control valve 191 that is connected to pressure line P and drain line D and is operable to pressurize and depressurize the actuators 176. The individual control valves 177 in turn are operable to pressurize and depressurize the opposite sides of the piston 183 to control the down force and raise and lower the row units 114 as needed.

Still further, referring to FIGS. 21-24, the cultivator 110 may also be operated by the vision guidance system 40 according to the foregoing description. The vision guidance system 40 incorporates a storable camera mount 200 having an imaging device, e.g., camera 201, wherein the camera mount 200 defines the vertical position of the camera 201 relative to the crop heights. Preferably, the camera 201 is operated in combination with crop sensors 202 for detecting the crop rows within the field of vision of the camera 201. As noted above, the field of vision does not encompass all rows being spanned by the toolbar 112 but rather, has a narrower field of vision to detect a segment of rows in front of the camera 201. Since the row units 114 move with the toolbar 112, guiding the row units 114 working the crop rows in the camera field of vision and centering the row units 114 relative to these rows will also adjust the row units 114 relative to the crop rows outside the camera field of vision.

Figure 21:
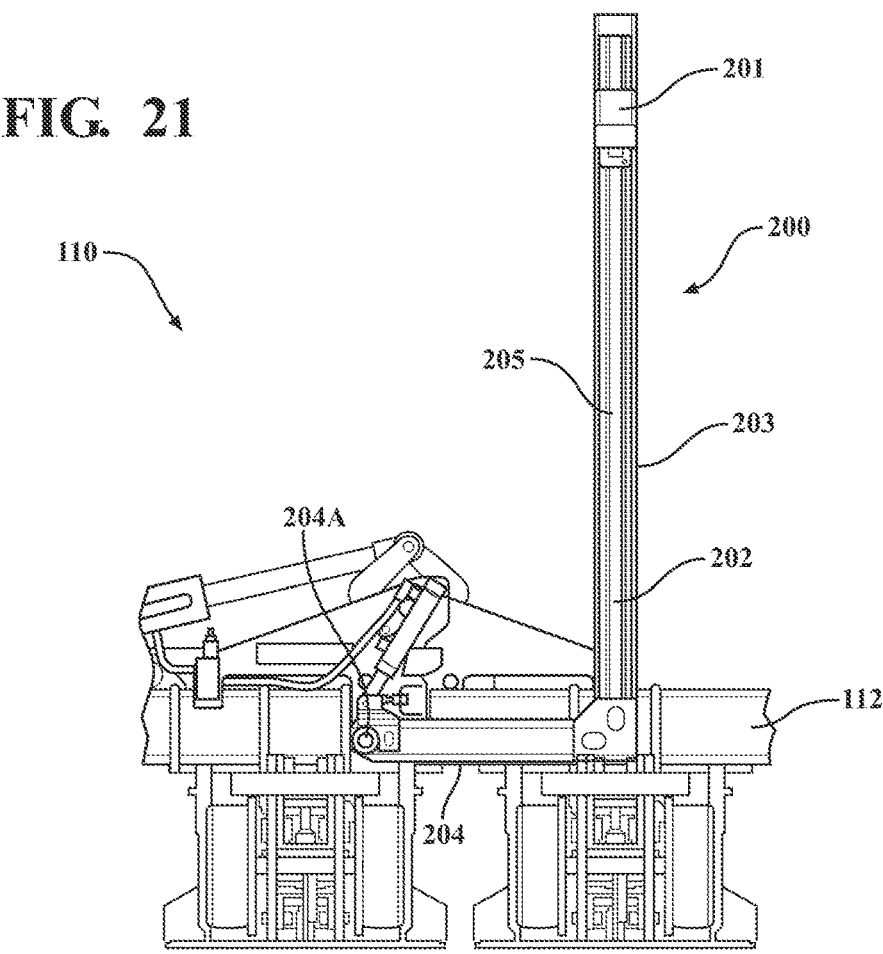
FIG. 21 is a front view showing a video camera support in a raised or unfolded use position.
Figure 22:
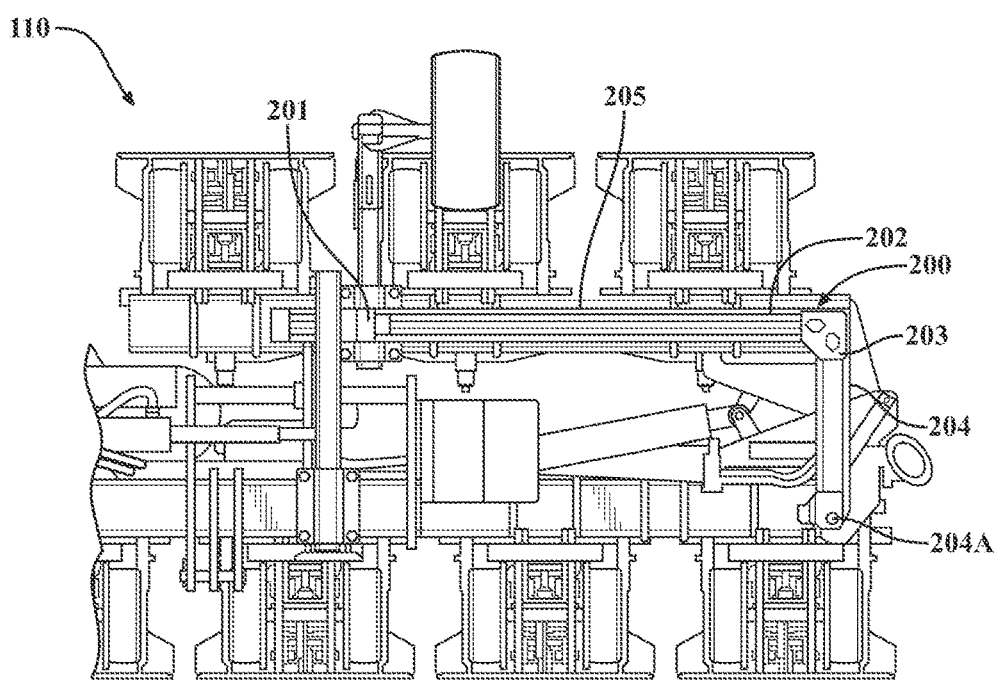
FIG. 22 is a front view showing the video camera support folded to a transport position.
Figure 23:
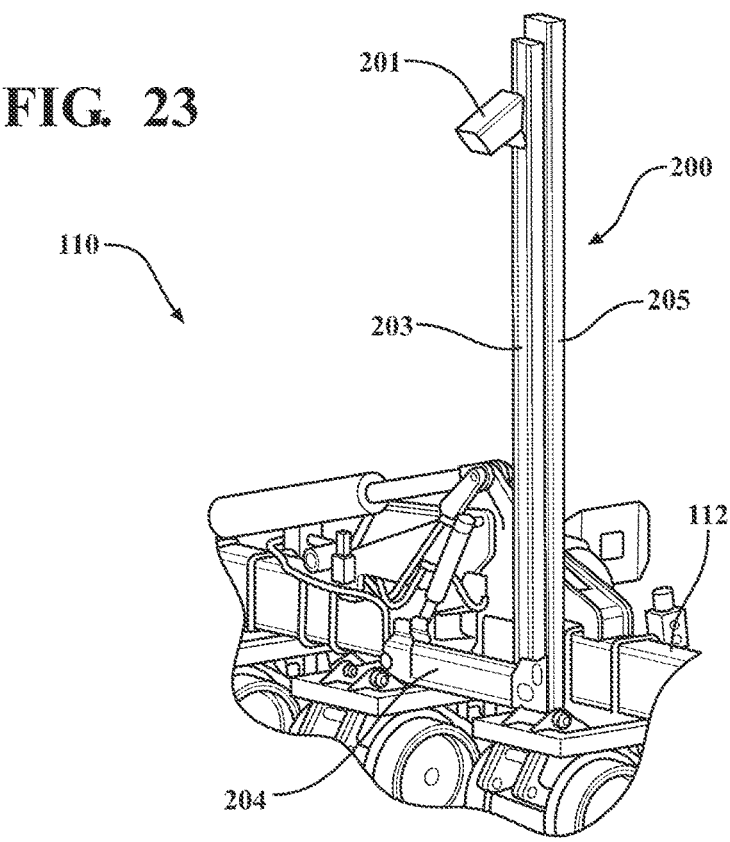
FIG. 23 is a perspective view of the video camera support of FIG. 21.
Figure 24:
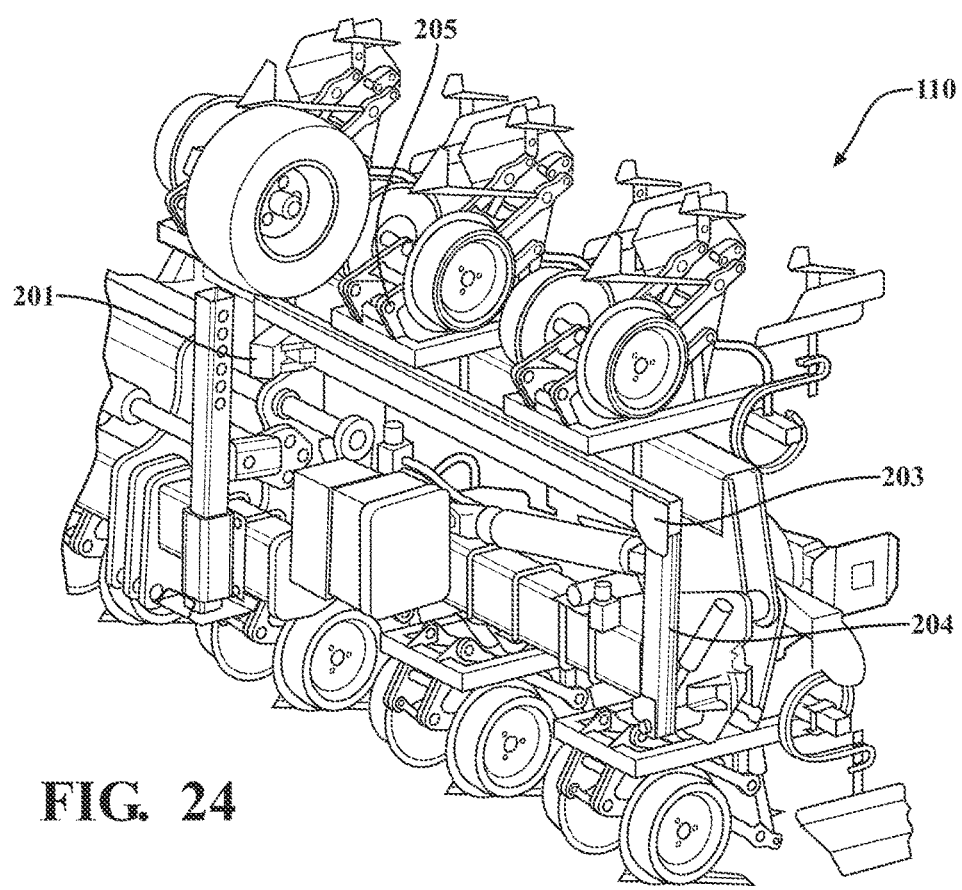
FIG. 24 is a perspective view of the video camera support of FIG. 22.

In more detail, the camera mount 200 preferably comprises a video camera support formed as a mast or arm 203. The mast 203 may have an L-shaped configuration that comprises a bottom leg 204, which is pivotally mounted on the toolbar 112 by a pivot mount 204A (FIGS. 21 and 22), and also comprises a vertical leg 205, which supports the camera 201 thereon. This allows the mast 203 to be folded down for transport and raised for field operations. FIGS. 21 and 23 show the video camera support mast 203 in a raised or unfolded use position, and FIGS. 22 and 24 show the mast 203 folded to a transport position.

In accord with the foregoing description, the vision guidance system 40 as provided with the cultivator 110 also includes an image processor 46 and a control unit 48 configured to control lateral toolbar shifting rather than the steering control disclosed relative to the first embodiment above. The imaging device 42 obtains images of the field as the trailed implement 110 is pulled through the field during field cultivation. The image processor 46 identifies rows within the images, and the control unit 48 adjusts the lateral position of the toolbar 112 to ensure that the row units 114 remain between the crop rows.

Here again, as disclosed relative to FIG. 5, the image processor 46 comprises a convolutional neural network based semantic segmentation model 50. The model 50 is trained using annotated images 52 of crop at various growth stages. The annotated images 52 include weak annotations 54 defining row positions on the images 52. Each weak annotation 54 comprises a line drawn above the crop row, and the model 50 is trained to infer larger scale row features in the image 52.

The vision guidance system 40 as implemented on the cultivator 110 is operated generally in accord with the process 68 shown in FIG. 6. Referring to FIGS. 5 and 6, the imaging device 42 obtains an image 56 of the field (step 70). Preferably, the image 56 encompasses a portion or segment of the total number of rows spanned by the toolbar 112.

The semantic segmentation model 50 segments the image 56 (step 72) to create a pixel-wise classification 58 of the image 56. The pixel-wise classification 58 distinguishes the crop rows 60 from the other parts of the plant and any other background information, including the soil and other plants that may be in the image 56. The image processor 46 applies a linear regression model to a kernel-based calculation of intensity peaks from the generated image mask. For example, the image processor 46 may divide the pixel-wise classification 58 into 6 rows and 2 columns (step 74), i.e., into 12 sections. Alternatively, rather than dividing the entire pixel-wise classification 58 into sections, the image processor 46 may focus on sections closer to the classified rows 60. The number of columns selected depends on the number of crop rows being analyzed. The image processor 46 identifies the intensity peak 64 within each section (step 76) by identifying the point with the highest number of crop row pixels across the width of each section. The intensity peaks 64 correspond to the center of the crop row within each section. The image processor 46 applies a linear regression model to the intensity peaks 64 to create regression lines 66 representing the crop rows in the image 62 (step 78).

The regression line 66 can be used to calculate the position and orientation of the trailed implement 10 relative to the position of the imaging device 42 and the crop row. If the vision guidance system 40 determines that the trailed implement 10 is drifting toward a crop row (step 80), the control unit 48 will adjust the lateral position of the toolbar 112 and row units 114 to compensate for the drift (step 82). The control unit 48 adjusts the lateral toolbar position using the adjustment actuator 143. The vision guidance system 40 uses feedback to constantly adjust the lateral toolbar position to keep the toolbar 112 centered on the rows.

At the end of a row, the operator may raise the row units 114 to turn. When the vision guidance system 40 detects that the implement 110 is turning into a new section of crop rows, it will recenter the toolbar 112 so that the row units 114 are in the correct position when the implement 110 is pulled through the next section of crop rows. GPS sensors also may be used to allow the implement 110 to follow the tractor's path when turning through standing crop on headlands to reduce crop damage.

In the preferred embodiment of the vision guidance system 40, the visual orientation and position of the image 56 acquired by the camera 201 may be calibrated based upon the lateral and vertical position of the camera 201 relative to the toolbar 112 and the row units 114 mounted thereon. This avoids the necessity of tracking structures and vehicle components within the field of view of the camera 201, such as the wheels, to determine the lateral position of the row units 114 and cutting devices 150 relative to the physical crop rows. As seen in FIG. 21, the lateral position of the camera 201 and mast 203 is preferably located at a stationary lateral position relative to the toolbar 112 and the row units 114. In the illustrated embodiment, the lateral position of the camera 201 and mast 203 is generally aligned laterally with the row units 114 so that the field of view of the acquired image 56 can be used by the vision guidance system 40 to determine the physical position of the row units 114 relative to the actual crop rows and can be used to determine the amount of lateral distance the toolbar 112 and row units 114 must be shifted to maintain proper alignment with the crop rows.

In more detail, the vision guidance system 40 is preferably calibrated by digitally generating a comparative mask for a desired field of view of the camera that incorporates idealized lines representing the target location and track of target crop rows as viewed from a given camera position. The idealized mask can be compared visually on a screen with the actual image 56 generated by the camera 201 that shows the location and track of actual crop rows for viewing by an operator during a calibration step, or may otherwise be processed to align the camera position with the idealized camera position. Ultimately, the calibration step preferably adjusts the camera position to align the actual row positions seen in the actual image 56 with the target row positions seen in the mask. In this regard, the camera mount 200 and camera 201 can be adjusted vertically so that the camera field of view includes the proper number of rows corresponding to the number of rows in the idealized mask with the actual rows being closely aligned with the idealized target rows. Further, the toolbar 112 can be adjusted laterally if desired to further align the actual rows with the target rows. The calibration step may overlay the actual image with the mask so that the operator can see the adjustments during calibration.

Once the actual rows and target rows are generally aligned and the vision guidance system is calibrated, the row units 14 will be located in the proper position for working the field adjacent to the crop rows without damage thereto. Essentially, the geometric position of the camera 201 relative to the toolbar 112 and row units 114 will properly position the row units 114 relative to the cutting devices 150. Thereafter, during operation, the regression line 66 can be used to calculate the position and orientation of the cultivator 110 or other trailed implement 10 relative to the position of the imaging device 42 and the crop row. If the vision guidance system 40 determines that the cultivator 110 is drifting toward a crop row, the control unit 48 adjusts the lateral toolbar position using the adjustment actuator 143. The vision guidance system 40 uses feedback to constantly adjust the lateral toolbar position to keep the toolbar 112 centered on the rows.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

The invention claimed is:

1. A system for navigating a vehicle through a field as it is being towed by a tractor, the vehicle including a frame having a top side and a bottom side, a body mounted on the top side of the frame and a pair of steerable wheels, wherein each wheel is mounted on a respective axle and operatively coupled to the frame, the system comprising:
    an imaging device mounted to the vehicle, wherein the imaging device is configured to collect an image of the field;
    an image processor adapted to segment the image and identify one or more crop rows; and
    a steering control adapted to steer the vehicle and avoid the one or more crop rows, wherein the steering control includes a steerable axle configured for steering the vehicle, wherein the steerable axle comprises:
        a pair of pivot arms, wherein each pivot arm is fixedly mounted to a respective axle and pivotally mounted to the frame of the vehicle;
        a hydraulic cylinder mounted to the bottom side of the frame; and
        a pair of tie rods, wherein each tie rod is connected between the hydraulic cylinder and a respective pivot arm to control pivotal movement of the respective wheel in response to actuation of the hydraulic cylinder based on the identified crop row by the imaging device.

2. The system of claim 1, wherein the image processor comprises a convolutional neural network based semantic segmentation model.

3. The system of claim 2, wherein the convolutional neural network based semantic segmentation model is trained using weak annotation.

4. The system of claim 3, wherein the weak annotation comprises a plurality of field images having lines representing crop rows in the plurality of field images.

5. The system of claim 1, wherein the image processor:
    divides the segmented image into a plurality of sections;

identifies an intensity peak within each section of the segmented image; and fits a line to the intensity peaks.

6. The system of claim 5, wherein the image processor:

calculates a position of the vehicle based on the fitted line; and uses the calculated position to steer the vehicle.

7. The system of claim 1, wherein the imaging device is mounted to the vehicle via an arm.

8. The system of claim 1 wherein the hydraulic cylinder is a double-ended hydraulic cylinder including rods extending axially from each opposite end of the cylinder and hydraulic hoses through which hydraulic fluid flows to and from the cylinder to control movement of each rod.

9. The system of claim 8 wherein the steerable axle further includes a Pitman arm having a first end fixedly mounted to the pivot arm and an opposite second end for controlling pivotal movement of the pivot arm relative to the frame.

10. The system of claim 9 further including a first tie rod having one end pivotally connected to one of the rods of the hydraulic cylinder and an opposite end pivotally connected to the second end of the respective Pitman arm and a second tie rod having one end pivotally connected to the other one of the rods of the hydraulic cylinder and an opposite end pivotally connected to the second end of the respective Pitman arm for controlling pivotal movement each pivot arm in response to actuation of the hydraulic cylinder.

11. The system of claim 10 wherein the steerable axle extends axially between the axle of each wheel.

12. The system of claim 11 wherein each pivot arm is pivotally mounted to the frame along a pivot axis generally perpendicular to the axial direction of the steerable axle.

* * * * *